US008744203B2

(12) United States Patent
El-Maleh et al.

(10) Patent No.: US 8,744,203 B2
(45) Date of Patent: Jun. 3, 2014

(54) DECODER-SIDE REGION OF INTEREST VIDEO PROCESSING

(75) Inventors: Khaled Helmi El-Maleh, San Diego, CA (US); Vijay Mahadevan, San Diego, CA (US); Haohong Wang, San Jose, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 13/458,387

(22) Filed: Apr. 27, 2012

(65) Prior Publication Data

US 2012/0213409 A1 Aug. 23, 2012

Related U.S. Application Data

(62) Division of application No. 11/615,470, filed on Dec. 22, 2006, now Pat. No. 8,315,466.

(51) Int. Cl.
*G06K 9/00* (2006.01)
(52) U.S. Cl.
USPC .......................................................... 382/251
(58) Field of Classification Search
USPC ......... 382/232–251, 166, 282, 103, 115, 118; 375/240.01–240.29
See application file for complete search history.

(56) References Cited

U.S. PATENT DOCUMENTS

| | | | |
|---|---|---|---|
| 6,160,846 A | | 12/2000 | Chiang et al. |
| 6,256,423 B1 * | | 7/2001 | Krishnamurthy et al. .... 382/251 |
| 6,272,179 B1 * | | 8/2001 | Kadono ................... 375/240.16 |
| 6,507,618 B1 | | 1/2003 | Wee et al. |
| 6,862,320 B1 * | | 3/2005 | Isu et al. ................... 375/240.27 |
| 7,027,509 B2 * | | 4/2006 | Jun et al. ................... 375/240.16 |
| 7,142,602 B2 | | 11/2006 | Porikli et al. |
| 7,277,484 B2 * | | 10/2007 | Kim et al. ................. 375/240.04 |
| 7,315,652 B2 | | 1/2008 | Takahashi et al. |
| 7,894,531 B1 * | | 2/2011 | Cetin et al. ............... 375/240.19 |

(Continued)

FOREIGN PATENT DOCUMENTS

EP 0996289 A2 4/2000
EP 1715693 A2 10/2006

(Continued)

OTHER PUBLICATIONS

Adiono T. et al., "Face Focus Coding Under H.263+ Video Coding Standard", in Proc. IEEE Asia-Pacific Conf Circuits and Systems, Dec. 2000, Tianjin, China, pp. 461-464.

(Continued)

*Primary Examiner* — Ishrat I Sherali
(74) *Attorney, Agent, or Firm* — Elaine H. Lo

(57) ABSTRACT

The disclosure is directed to decoder-side region-of-interest (ROI) video processing. A video decoder determines whether ROI assistance information is available. If not, the decoder defaults to decoder-side ROI processing. The decoder-side ROI processing may estimate the reliability of ROI extraction in the bitstream domain. If ROI reliability is favorable, the decoder applies bitstream domain ROI extraction. If ROI reliability is unfavorable, the decoder applies pixel domain ROI extraction. The decoder may apply different ROI extraction processes for intra-coded (I) and inter-coded (P or B) data. The decoder may use color-based ROI generation for intra-coded data, and coded block pattern (CBP)-based ROI generation for inter-coded data. ROI refinement may involve shape-based refinement for intra-coded data, and motion- and color-based refinement for inter-coded data.

20 Claims, 18 Drawing Sheets

(56) References Cited

U.S. PATENT DOCUMENTS

| | | | |
|---|---|---|---|
| 8,315,466 | B2 | 11/2012 | El-Maleh et al. |
| 8,483,283 | B2* | 7/2013 | Tian et al. ............... 375/240.24 |
| 2004/0228535 | A1 | 11/2004 | Honda et al. |
| 2004/0233987 | A1 | 11/2004 | Porikli et al. |
| 2004/0234144 | A1* | 11/2004 | Sugimoto et al. ............ 382/239 |
| 2005/0141610 | A1* | 6/2005 | Isu et al. .................. 375/240.12 |
| 2006/0051068 | A1* | 3/2006 | Gomila ......................... 386/114 |
| 2006/0062478 | A1* | 3/2006 | Cetin et al. .................... 382/232 |
| 2006/0215752 | A1 | 9/2006 | Lee et al. |
| 2006/0215753 | A1 | 9/2006 | Lee et al. |
| 2007/0121723 | A1* | 5/2007 | Mathew et al. .......... 375/240.12 |
| 2009/0097543 | A1 | 4/2009 | Pan et al. |

FOREIGN PATENT DOCUMENTS

| | | | |
|---|---|---|---|
| JP | 2001119696 | A | 4/2001 |
| JP | 2002330951 | A | 11/2002 |
| JP | 2004134938 | A | 4/2004 |
| JP | 2004343451 | A | 12/2004 |
| KR | 20040065753 | A | 7/2004 |
| WO | WO2006093999 | | 9/2006 |
| WO | WO2006094000 | | 9/2006 |
| WO | WO2006115591 | | 11/2006 |
| WO | WO2006130198 | A1 | 12/2006 |

OTHER PUBLICATIONS

Agarwal et al., "A Fast Algorithm to Find the Region-of-Interest in the Compressed MPEG Domain", Proceedings of the International Conference on Multimedia and Expo, 2003 (ICME '03). Jul. 6-9 2003,vol. 2, 133-136.
Cavallaro A. et al., "Tracking Video Objects in Cluttered Background", IEEE Trans. Circuits and Systems for Video Technology, vol. 15, No. 4, Apr. 2005, pp. 575-584.
Chai, at al.: "Face Segmentation Using Skin-Color Map in Videophone Applications," IEEE Transactions on Circuits and Systems for Video Technology, vol. 9, No. 4 (Jun. 1999), pp. 551-564, XP011014577. ISSN:1051-8215.
Chen M. et al., "ROI Video Coding Based on H.263+ with Robust Skin-Color Detection Technique", IEEE Trans. Consumer Electronics, vol. 49, No. 3, Aug. 2003. pp. 724-730.
Daly S. et al., "As Plain as the Noise on Your Face: Adaptive Video Compression Using Face Detection and Visual Eccentricity Models", Journal of Electronic Imaging, 10(1), Jan. 2001, pp. 30-46.
Eickeler S. et al., "Recognition of JPEG Compressed Face Images Based on Statistical Methods", Image and Vision Computing 18 (2000), 279-287.
Eleftheriadis A. et al., "Automatic Face Location Detection and Tracking for Model-Assisted Coding of Video Teleconferencing Sequences at Low Bit-Rates", Signal Processing: Image Communications, vol. 7, No. 4-6, pp. 231-248, Nov. 1995.
Han J. et al., "Unsupervised Extraction of Visual Attention Objects in Color Images", IEEE Trans. Circuits and System for Video Technology, vol. 16, No. 1, Jan. 2006, pp. 141-145.
Hong, et al.: "A Reduced Complexity Loop Filter Using Coded Block Pattern and Quantization Step Size for H.26L Video Coder," International Conference on Consumer Electronics, 2001 Digest of Technical Papers, ICCE. Los Angeles, CA, pp. 170-171, XP010552117, ISBN: 978-0-7803-6622-0, Jun. 19, 2001.
International Search Report—PCT/US2007/088347, International Searching Authority—European Patent Office—Sep. 29, 2008.
ISO/IEC 14496-10, Information technology—Coding of audio-visual objects, Part 10: Advanced Video Coding, Second edition Oct. 1, 2004, 280 pages.
ISO/IEC JTC 1/SC 29/WG 11 N2689; "Description of Core Experiments in MPEG-4 Video," International Organization for Standardization ISO/IEC JTC 1/SC 29/WG 11 Coding of Moving Pictures and Audio, Source: Jens-Rainer Ohm, pp. 1-46, XP002214090, Mar. 1999.
ITU-T H.263, Series H: Audiovisual and Multimedia Systems, Infrastructure of audiovisual services—Coding of moving video, Video coding for low bit rate communication, Jan. 2005, 226 pages.
ITU-T H.264, Series H: Audiovisual and Multimedia Systems, Infrastructure of audiovisual services—Coding of moving video, Advanced vido coding for generic audiovisual services, Mar. 2005, 343 pages.
Jerbi A. et al., "Error Resilient Region of Interest Video Coding", IEEE Trans. Circuits Systems for Video Technology, vol. 15, No. 9, Jun. 2005, pp. 1175-1181.
Lee, et al.: "Perceptual Activity Measures Computed from Blocks in the Transform Domain," Elsevier North-Holland, Inc., Amsterdam, The Netherlands, Signal Processing, vol. 82, Issue 4, pp. 693-707, XP004349788, ISSN:0165-1684, Apr. 1, 2002.
Lee J. et al., "Spatial-Temporal Model Assisted Compatible Coding for Low and Very Low Bitrate Video Telephony", in Proc. IEEE Int. Conf. Image Proc., vol. 2, pp. 429-432, Lausanne, Switzerland, Sep. 1996.
Li, et al.: "Lazy Snapping," ACM Transactions on Graphics (TOG), vol. 23, issue 3, Proceeding of the 2004 SIGGRAPH Conference, pp. 303-308, XP009099127, ISSN: 0730-0301. 2004.
Li H. et al., "Face Segmentation in Head-and-Shoulder Video Sequence Based on Facial Saliency Map", IEEE International Symposium on Circuits and Systems, Kos, Greece, May 2006.
Lin C. et al., "A Low-Complexity Face-Assisted Coding Scheme for Low Bit-Rate Video Telephony", IEICE Trans. Inf. & Syst., vol. E86-D, No. 1, Jan. 2003. pp. 101-108.
Luo H. et al., "On Face Detection in the Compressed Domain", Proceedings of the eighth ACM international conference on Multimedia, 2000, pp. 285-294.
Meier T. et al., "Automatic Segmentation of Moving Objects for Video Object Plane Generation", IEEE Trans. Circuits and System for Video Technology, vol. 8, No. 5, Sep. 1998, pp. 525-538.
Partial International Search Report—PCT/US2007/088347, International Searching Authority—European Patent Office—Jul. 1, 2008.
Sengupta S. et al., "Perceptually Motivated Bit-Allocation for H.264 Encoded Video Sequences", ICIP'03, vol. III, pp. 797-800.
Shen, et al. "Direct feature extraction from compressed images", SPIE, 1996, pp. 404-414.
Shirani S. et al., "Application of Nonlinear Pre- and Post-Processing in Low Bit Rate, Error Resilient Image Communication", Signal Processing: Image Communication, Oct. 2003, pp. 823-835.
Taiwan Search Report—TW096149619—TIPO—Oct. 12, 2011.
Tancharoen D. et al.,"Automatic Face Color Segmentation Based Rate Control for Low Bit-Rate Video Coding", in Proc. 2003 International Symposium on Circuits and Systems (ISCAS'03), vol. II, pp. 384-387.
Tsapatsoulis N. et al., "Face Extraction from Non-Uniform Background and Recognition in Compressed Domain", ICASSP '98. May 2-15, 1998, vol. 5, pp. 2701-2704.
Wang et al., "A highly efficient system for automatic face region detection in MPEG video." IEEE Trans. On Circuits and Systems for Video Technology, vol. 7 Issue 4, Aug. 1997, pp. 615-628.
Written Opinion—PCT/US2007/088347, International Searching Authority—European Patent Office—Sep. 29, 2008.
Wu et al., "Multi-level data hiding for digital image and video", SPIE, vol. 3854, 1999.
Yang X. K. et al., "Local Visual Perceptual Clues and its Use in Videophone Rate Control", ISCAS'2004, vol. III, pp. 805-808.
Zhang, et al., "The extraction of image's salient points for image retrieval", Fuzzy Systems,and Knowledge Discovery 2005, LNAI 3613, pp. 547-556.

* cited by examiner

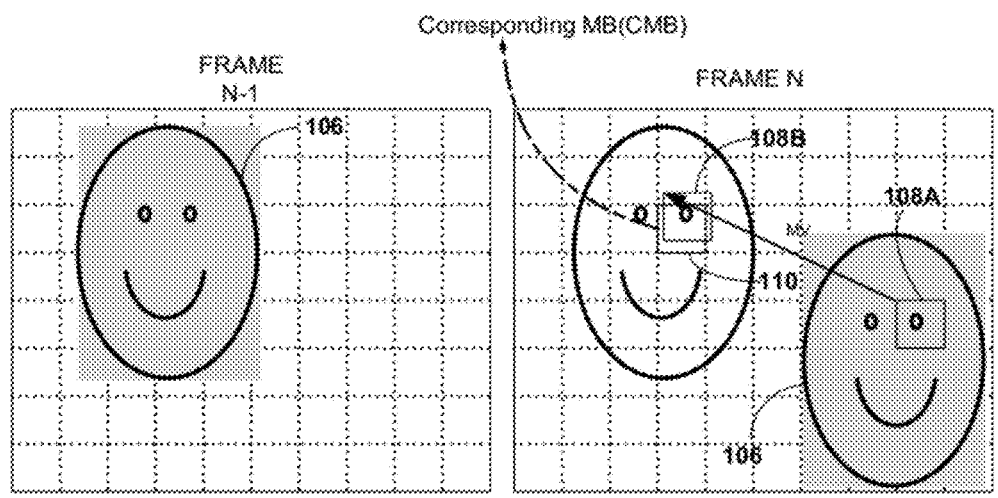
FIG. 10A        FIG. 10B

DECODER-SIDE REGION OF INTEREST VIDEO PROCESSING

CROSS-REFERENCE TO RELATED APPLICATIONS

The present application for patent is a divisional of U.S. patent application Ser. No. 11/615,470, "DECODER-SIDE REGION OF INTEREST VIDEO PROCESSING," filed Dec. 22, 2006, and assigned to the assignee hereof and hereby expressly incorporated by reference herein.

TECHNICAL FIELD

The disclosure relates to digital video decoding and, more particularly, techniques for identifying and processing region-of-interest (ROI) portions of a video frame.

BACKGROUND

Digital video capabilities can be incorporated into a wide range of devices, including digital televisions, digital direct broadcast systems, wireless communication devices, personal digital assistants (PDAs), laptop computers, desktop computers, digital music and video players, handheld gaming devices, video game consoles, digital cameras, digital recording devices, cellular or satellite radio telephones, and the like. Digital video devices can provide significant improvements over conventional analog video systems in processing and transmitting video sequences with increased bandwidth efficiency.

Different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video encoding standards support improved transmission efficiency of video sequences by encoding data in a compressed manner.

Detection of ROI content may be desirable in a variety of video applications, including video event analysis and editing, video retrieval and browsing, video surveillance, video telephony, and video broadcasting. One example of an ROI is a human face, although other objects within a video scene may be important. In a video conference, for example, the ROI may present a participant's facial expressions or a drawing on a whiteboard. Using preferential encoding, the ROI may be presented with greater clarity and/or detail relative to other non-ROI areas.

SUMMARY

The disclosure is directed to techniques for decoder-side ROI video processing. A video decoder may be configured to determine whether ROI assistance is available, e.g., by detecting a signal or code in the encoded bitstream, detecting characteristics of the encoded bitstream, or detecting out-of-band side information. As examples, ROI assistance may include an ROI map that identifies the ROI or chroma threshold information identifying a range of chroma values within the ROI.

The ROI assistance information may be provided by an encoder. Alternatively, the ROI assistance information may be provided by one or more intermediate devices between the encoder and decoder, such as a network device within or coupled to a network. If ROI assistance information is available, the video decoder may use an assisted ROI processing technique to apply preferential decoding, post-processing and/or error concealment to the ROI and/or to a non-ROI area of a video frame. If encoder ROI assistance is not available, the video decoder may default to a decoder-side ROI processing technique.

The decoder-side ROI processing technique may apply a reliability analysis that estimates the reliability of ROI extraction in the bitstream domain. If ROI reliability is favorable, the decoder may apply a bitstream domain ROI extraction process prior to video frame decoding. If ROI reliability is unfavorable, the decoder may apply a pixel domain ROI extraction process after video frame decoding. In either case, preferential decoding, post-processing and/or error concealment may be applied to the resulting ROI and/or non-ROI area.

For bitstream domain ROI extraction, the video decoder may apply a first stage that produces a coarse ROI. A second stage refines the coarse ROI from the first stage to produce a fine ROI. The video decoder may apply different ROI extraction processes for intra-coded (I) or inter-coded (P or B) video data. For example, the video decoder may use a color-based ROI mask generator for intra-coded data, and a coded block pattern (CBP)-based ROI mask generator for inter-coded data. ROI refinement may be achieved by shape-based mask refinement for intra-coded data, and motion- and color-based mask refinement for inter-coded data.

In one aspect, the disclosure provides a method comprising applying a first process to identify a region of interest (ROI) in encoded video data if information to assist ROI identification is available, and applying a second process to identify the ROI in the encoded video data if the information to assist ROI identification is not available.

In another aspect, the disclosure provides a method comprising analyzing one or more characteristics of encoded video data to determine reliability of region of interest (ROI) identification using bitstream domain analysis of the encoded video data, identifying the ROI using bitstream domain analysis of the encoded video data when the determined reliability is acceptable, and identifying the ROI using pixel domain analysis of the encoded video data when the determined reliability is unacceptable.

In a further aspect, the disclosure provides a method comprising identifying a region of interest (ROI) in encoded video data based on color characteristics of the encoded video data for intra-coded data, and identifying the ROI based on coded block pattern (CBP) characteristics of the encoded video data for inter-coded data.

In another aspect, the disclosure provides a device comprising a first module that applies a first process to identify a region of interest (ROI) in encoded video data if information to assist ROI identification is available, and a second module that applies a second process to identify the ROI in the encoded video data if information to assist ROI identification is not available.

In an additional aspect, the disclosure provides a device comprising a first module that analyzes one or more characteristics of encoded video data to determine reliability of region of interest (ROI) identification using bitstream domain analysis of the encoded video data, a second module that identifies the ROI using bitstream domain analysis of the encoded video data when the determined reliability is acceptable, and a third module that identifies the ROI using pixel domain analysis of the encoded video data when the determined reliability is unacceptable.

In a further aspect, the disclosure provides a device comprising a first module that identifies a region of interest (ROI) in encoded video data based on color characteristics of the encoded video data for intra-coded data, and a second module that identifies the ROI based on coded block pattern (CBP) characteristics of the encoded video data for inter-coded data.

The techniques described in this disclosure may be implemented in a digital video decoding apparatus in hardware, software, firmware, or any combination thereof. If implemented in software, the software may be executed in a computer. The software may be initially stored as instructions, program code, or the like. Accordingly, the disclosure also contemplates a computer program product for digital video decoding comprising a computer-readable medium, wherein the computer-readable medium comprises instructions for causing a computer to execute techniques in accordance with this disclosure.

The details of one or more embodiments are set forth in the accompanying drawings and the description below. Other features, objects, and advantages will be apparent from the description and drawings, and from the claims.

BRIEF DESCRIPTION OF DRAWINGS

FIG. 10 is a diagram illustrating definition of an ROI in a P frame.

DETAILED DESCRIPTION

Figure 1:
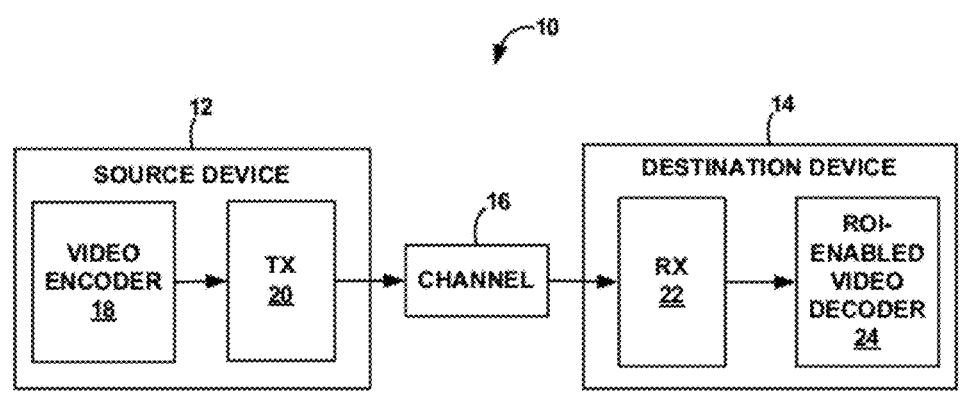
FIG. 1 is a block diagram illustrating a video encoding and decoding system incorporating a video decoder configured for decoder-side ROI processing.

The disclosure is directed to techniques for decoder-side region-of-interest (ROI) video processing. A video decoder may be configured to determine whether ROI assistance information is available, e.g., by detecting a signal or code in the encoded bitstream, detecting characteristics of the encoded bitstream, or detecting out-of-band side information. In general, the ROI assistance information may include any information added to the encoded video bitstream or sent as side information to assist the decoder in identifying the ROI. As an example, ROI assistance information may include an ROI map that identifies the ROI, e.g., by marking blocks such as macroblocks (MBs) within a video frame as ROI or non-ROI blocks. As an alternative, the assistance information may include chroma threshold information identifying a range of chroma values within the ROI. The ROI assistance information may be provided by an encoder. Alternatively, the ROI assistance information may be provided by one or more intermediate devices between the encoder and decoder, such as a network device within or coupled to a network.

If ROI assistance is available, the video decoder may use an assisted ROI processing technique to determine the ROI and apply preferential decoding, post-processing and/or error concealment to the ROI and/or the non-ROI areas of the video frame. If ROI assistance is not available, the video decoder may default to a decoder-side ROI processing technique. Decoding, post-processing and/or error concealment may generally be referred to as processing in this disclosure. The term "preferential," as used in this disclosure, may generally refer to a quality and/or quantity of decoding, post-processing and/or error concealment that is enhanced, increased or otherwise improved relative to normal processing of other areas that are not subject to preferential processing. In general, preferential processing may be formulated to enhance visual quality of an area to which it is applied, and may be applied to ROI or non-ROI areas of a video frame.

The decoder-side ROI processing technique may apply a reliability analysis that estimates the reliability of bitstream ROI extraction. If ROI reliability is favorable, the decoder may apply a bitstream domain ROI extraction process prior to video frame decoding. If ROI reliability is unfavorable, the decoder may apply a pixel domain ROI extraction process after video frame decoding. In either case, preferential decoding, post-processing and/or error concealment may be applied to the resulting ROI and/or the resulting non-ROI. Bitstream domain ROI extraction may refer to ROI extraction using data available in the encoded video bitstream including, without limitation, coded block pattern (CBP) values, motion vectors (MVs), chroma values, or the like. Coded block pattern (CBP) indicates which blocks within a macroblock contain coded non-zero coefficients. Pixel domain ROI extraction may refer to ROI extraction using pixel domain data that is available after the encoded video bitstream has been decoded and reconstructed, including pixel intensity and color values.

For compressed domain ROI extraction, the video decoder may apply a first stage that produces a coarse ROI. A second stage refines the coarse ROI from the first stage to produce a fine ROI. The video decoder may apply different processes for ROI extraction in frames including intra-coded (I) or inter-coded (P or B) data. A P frame refers to a uni-directional predictive frame, while a B frame refers to a bi-directional predictive frame. P or B data refers to a frame that is inter-coded or data within a frame that is inter-coded. I data refers to a frame that is intra-coded or data within a frame that is intra-coded.

The video decoder may use a color-based ROI mask generator for intra-coded data, and a coded block pattern (CBP)-based ROI mask generator for inter-coded data. A frame may be classified as an I frame if it includes intra MBs, while a frame may be classified as a P frame if it includes a predominance of inter MBs. In some cases, the color-based ROI mask generator and CBP-based ROI mask generator may be applied to different sets of MBs within a common frame that includes both inter-coded and intra-coded data.

The video decoder may apply preferential decoding, post-processing and/or error concealment to enhance the quality of the resulting ROI and/or ROI. For example, the video decoder may apply preferential decoding, post-processing and/or error concealment to enhance the visual quality of the ROI. Alternatively, or additionally, the video decoder may apply preferential decoding, post-processing and/or error concealment to enhance the visual quality of the non-ROI areas. As an example, the encoder or some intermediate device may have applied preferential encoding to the ROI area. Hence, in recognition that the ROI area already may be encoded with higher quality, the decoder may apply additional processing power to provide preferential decoding, post-processing and/or error concealment for the non-ROI areas that did not benefit from preferential processing at the encoder side.

In some aspects, ROI assistance information may include, in addition to information helpful in ROI identification, information indicating whether the encoder or some intermediate device has applied preferential encoding or other processing to the ROI. This information may be used by the decoder in deciding whether to apply preferential processing to the ROI or the non-ROI areas of the video frame. Hence, the decoder may be additionally configured to analyze ROI assistance information to determine whether preferential processing should be applied to the ROI or non-ROI areas of the video frame.

FIG. 1 is a block diagram illustrating a video encoding and decoding system 10 including a source device 12 and a destination device 14. Source device 12 transmits encoded video to destination device 14 via a communication channel 16. Source device includes a video encoder 18 and a transmitter (TX) 20. Destination device 14 includes a receiver (RX) 22 and ROI-enabled video decoder 24. Communication channel 16 may be a wired or wireless communication medium. System 10 may support bi-directional multimedia communication via channel 16, e.g., for video telephony. Alternatively, system 10 may be configured for multimedia streaming or broadcasting in one direction, e.g., from source device 12 to destination device 14. In some aspects, one or more intermediate devices may be provided, e.g., within a network associated with channel 16, to apply ROI analysis or other video processing to video frames generated by video encoder 18.

Transmission of multimedia content from source device 12 to destination device 14 will be described for purposes of illustration, and may apply to one-way or two-way communication of multimedia content. For two-way communication, reciprocal encoding, decoding, multiplexing (MUX) and demultiplexing (DEMUX) components may be provided on opposite ends of channel 16. In particular, source device 12 and destination device 14 each may include an encoder and decoder, e.g., arranged in a combined CODEC, for two-way multimedia communication. In this case, source device 12 and destination device 14 may be mobile wireless terminals equipped for video telephony, as well as voice telephony.

For one-way communication, source device 12 may form part of a multimedia broadcast device that broadcasts or streams video to one or more subscriber devices. In this case, destination device 14 may be embodied within a video communication device such as a mobile wireless terminal equipped to receive multimedia broadcasts, as well as support video telephony. ROI-enabled video decoder 24 may be applied to ROI identification for video received from source device 12 as part of a one-way or two-way communication. In each case, video received by destination device 14 may include an ROI for which preferential processing to enhance visual quality may be desirable.

System 10 may support video telephony or video streaming according to the Session Initiated Protocol (SIP), ITU-T H.323 standard, ITU-T H.324 standard, or other standards. Video encoder 18 generates encoded video data according to a video compression standard, such as MPEG-2, MPEG-4, ITU-T H.263, or ITU-T H.264 and its counterpart, ISO/IEC MPEG-4, Part 10, i.e., Advanced Video Coding. Although not shown in FIG. 1, video encoder 18 and video decoder 24 may be integrated with an audio encoder and decoder, respectively, and include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

In some aspects, this disclosure contemplates application to Enhanced H.264 video coding for delivering real-time video services in terrestrial mobile multimedia multicast (TM3) systems using the Forward Link Only (FLO) Air Interface Specification, "Forward Link Only Air Interface Specification for Terrestrial Mobile Multimedia Multicast," to be published as Technical Standard TIA-1099 (the "FLO Specification"). The FLO Specification includes examples defining bitstream syntax and semantics and decoding processes suitable for delivering services over the FLO Air Interface. However, the ROI techniques described in this disclosure are not limited to any particular type of broadcast, multicast, or point-to-point system Video encoder 18 and ROI-enabled video decoder 24 each may be implemented as one or more processors, digital signal processors, application specific integrated circuits (ASICs), field programmable gate arrays (FPGAs), discrete logic, software, hardware, firmware or any combinations thereof. Each of video encoder 18 and video decoder 24 may be included in one or more encoders or decoders, either of which may be integrated as part of a combined encoder/decoder (CODEC) in a respective subscriber device, broadcast device, server, or the like. In addition, transmitter 20 and receiver 22 each may include appropriate modulation, demodulation, frequency conversion, filtering, and amplifier components for transmission and reception of encoded video, as applicable, including radio frequency (RF) wireless components and antennas. For ease of illustration, however, such components are not shown in FIG. 1.

System 10 may be configured to support techniques for ROI coding, as described herein. For example, video encoder 18 in source device 12 may be configured to identify an ROI in a video frame and include ROI assistance information with the encoded video frame to assist video decoder 24 in identifying the ROI. The ROI assistance information may be embedded within the encoded video frame bitstream, or provided as out-of-band side information. The ROI assistance information may be generated by encoder 18 or by an intermediate device within or coupled to a network over which source device 12 and destination device 15 communicate. The intermediate device may be configured, for example, to identify the ROI using a variety of techniques including bitstream domain ROI extraction or pixel domain ROI extraction. An intermediate device may have greater processing power than source device 12, enabling application of any or a variety of effective ROI detection techniques.

As an example, video encoder 18 or an intermediate device may be configured to produce an ROI map that designates blocks within the video frame that reside within the ROI, e.g., based on explicit designation of the ROI by a user or automated ROI detection using techniques such as skin tone detection. Another example of ROI assistance information is chroma threshold information indicating a range of chroma values that correspond to an ROI, e.g., such as chroma values corresponding to skin tones. Again, such information may reside within the encoded video bitstream or be transmitted as out-of-band side information separate from the encoded video bitstream.

In the context of identifying the ROI, the terms extract, detect and identify may be used generally interchangeably. An ROI map may be formed by identifying individual blocks, such as macroblocks (MBs), with a 1 or 0 to designate ROI and non-ROI blocks, respectively. A macroblock is a video block that forms part of a frame. The size of the MB may be 16 by 16 pixels. However, other sub-block sizes are possible. For example, the H.264 standard permits encoding of blocks with a variety of different sizes, e.g., 16×16, 16×8, 8×16, 8×8, 4×4, 8×4, and 4×8. Macroblocks will be described herein for purposes of illustration, with the understanding that macroblocks or other video blocks may have a variety of different sizes.

Using an ROI map or other information indicative of the portion of the encoded video data that reside within an ROI in a received video frame, video encoder 18 or an intermediate device may support encoder-assisted ROI detection by ROI-enabled video decoder 24. Alternatively, ROI-enabled video decoder 24 may apply decoder-side ROI detection without the assistance of video encoder 18 or any intermediate device. Hence, decoder 24 may apply a first process to identify a region of interest (ROI) in encoded video data if the encoded video data includes information to assist ROI identification, and apply a second process to identify the ROI in the encoded video data if the encoded video data does not include information to assist ROI identification.

In each case, upon detection of the ROI at the decoder side, video decoder 24 may apply preferential decoding, post-processing and/or error concealment to enhance visual quality of either the ROI or non-ROI, or possibly apply different levels of such preferential processing to the ROI and non-ROI. To determine whether ROI assistance is available, video decoder 24 may detect a signal or code in the encoded bitstream or detect characteristics of the encoded bitstream. Hence, video encoder 18 or an intermediate device may include a signal or code in the encoded bitstream to indicate availability of ROI assistance. In some cases, the presence of an ROI map or other ROI assistance information in the encoded bitstream may serve as the signal or code to indicate ROI assistance. Alternatively, video encoder 18 or an intermediate device may provide an out-of-band signal to indicate the presence of ROI assistance information in the video bitstream, or provide the out-of-band signal and the ROI assistance information as out-of-band side information. For example, the information may be provided in an administrative header or frame that is transmitted with the video frame.

If ROI assistance is not available, video decoder 24 applies a decoder-side ROI processing technique. Video decoder 24 may apply a reliability analysis to determine whether to apply ROI processing in the bitstream domain or the reconstructed pixel domain. If the likely reliability of an ROI extracted in the bitstream domain is found to be unfavorable, decoder 24 may apply a pixel domain ROI extraction process after video frame decoding. Decoder 24 selects compressed domain ROI extraction if it is found likely to be reliable. The reliability analysis may involve analysis of one or more characteristics of the encoded video data to determine reliability of ROI identification using bitstream domain analysis. As will be described, for example, the reliability analysis applied by decoder 24 may rely on analysis of quantization parameter (QP) values for the video frame under evaluation. More particularly, the reliability analysis applied by decoder 24 may analyze average QP values for luma and chroma components of the encoded video data in the frame, and indicates unacceptable reliability when the average QP values exceed a threshold value.

If reliability is unfavorable, decoder 24 may apply a pixel domain ROI extraction process after video frame decoding. ROI extraction in the reconstructed pixel domain at the decoder side is effective, but may be less desirable for real-time applications with low power consumption constraints, such as applications within mobile wireless communication devices. Accordingly, if ROI extraction in the bitstream is likely to be reliable, then bitstream-based ROI extraction will ordinarily be more desirable. In particular, ROI extraction in the bitstream domain may present reduced computational complexity and power consumption than in the reconstructed pixel domain. However, the accuracy of bitstream domain ROI extraction may be influenced by the characteristics of the video encoder used to generate the bitstream.

Accordingly, system 10 may implement a robust technique for ROI extraction that is capable of transitioning from bitstream domain ROI extraction to pixel domain ROI extraction when bitstream domain ROI extraction is likely to be unreliable due to characteristics of the encoded video data. In addition, in some aspects, system 10 may be intelligent in the sense that it may automatically identify and adapt to situations in which ROI assistance information is available. If ROI assistance information is available, decoder 24 may use the assistance information to identify the ROI. If the ROI assistance information is not available, decoder 24 may default to a decoder-side ROI extraction technique that is applied either in the bitstream domain or the reconstructed pixel domain, as discussed above, based on predicted reliability of bitstream domain ROI extraction.

If estimated reliability is acceptable, video decoder 24 applies a bitstream domain ROI extraction process that may include two different paths, one for intra-coded (I) data and another for inter-coded (P or B) data. One path may handle I frames and, in some cases, intra-coded MBs from P frames. The other path handles P frames and, in some cases, inter-coded MBs in P frames including intra MBs and inter MBs. In addition, each path may include two stages, a first, coarse ROI estimation stage and a second, fine ROI estimation stage that refines the coarse ROI from the first stage to produce a fine ROI. For intra-coded data, such as in I frames or P frames, video decoder 24 may use a color-based ROI mask generator to identify a coarse ROI, and then refine the coarse ROI based on shape characteristics of the encoded video data. For inter-coded data, such as in P or B frames, video decoder 24 may identify a coarse ROI based on coded block pattern (CBP) characteristics of the encoded video data, and then refine the coarse ROI based on motion and color characteristics of the encoded video data. Upon assisted or decoder side identification of an ROI, decoder 24 may apply preferential decoding, post-processing and/or error concealment, collectively referred to as preferential processing, to enhance the quality of the resulting ROI or non-ROI areas.

Figure 2:
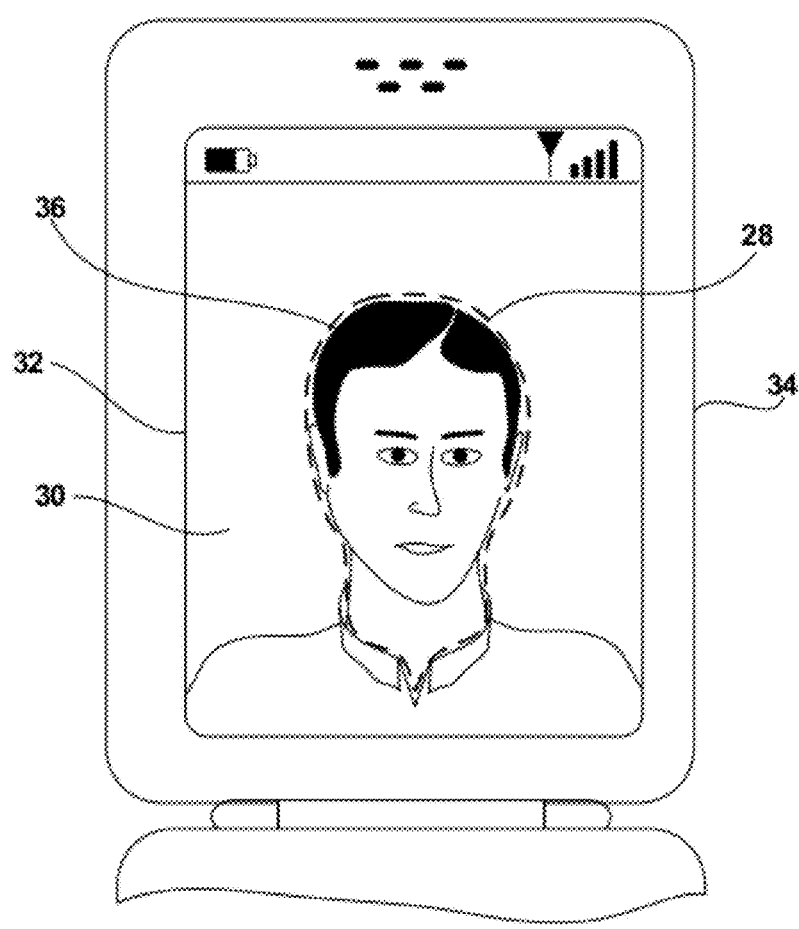
FIG. 2 is a diagram illustrating definition of an ROI within a video scene presented on a display associated with a wireless communication device.

FIG. 2 is a diagram illustrating definition of an ROI 28 within a video scene 30 presented on a display 32 associated with a wireless communication device 34. In the example of FIG. 2, the ROI 28 is depicted as a non-rectangular ROI having a rounded or irregular shape that substantially conforms to an object, such as a human head 36 or face. Alternatively, a rectangular ROI may be provided. In either case, ROI 28 may be detected or otherwise identified at source device 12, e.g., in encoder 18, detected in an intermediate device, e.g., in the network, or automatically detected at destination device 14, e.g., in decoder 24, with or without ROI assistance.

If source device 12 is configured to provide ROI assistance, source device 12 may define ROI 28 manually based on ROI input from a user, automatically using automated identification techniques, or using a combination of manual and automatic ROI identification. ROI 28 may encompass a portion of video scene 30 that contains head 36 or a face. ROI 28 may be used, however, to specify objects other than the face. The size and position of ROI 28 may be fixed or adjustable, and may be defined, described or adjusted in a variety of ways. ROI 28 permits preferential processing to enhance the visual quality of individual objects within a transmitted video scene 30. In this manner, ROI 28 permits a video recipient to more clearly view desired objects within a received video scene 30. For example, encoder 18 may apply preferential encoding to the ROI to enhance visual quality, or decoder 24 may apply preferential processing to the ROI or non-ROI to enhance visual quality.

In some cases, if encoder 18 identifies ROI 28, the encoder may encode the ROI with higher image quality relative to non-ROI areas such as background regions of video scene 30. In this way, the user associated with destination device 14 is able to more clearly view facial expressions, lip movement, eye movement, and the like within the video encoded by encoder 18. Alternatively, or additionally, decoder 24 in destination device 14 may apply preferential decoding, post-processing and/or error concealment to enhance visual quality of ROI 28 or to areas that do not reside within the ROI. For example, video decoder 24 may apply preferential decoding, post-processing and/or error concealment to enhance the visual quality of the non-ROI areas. As an example, encoder 18 or some intermediate device may have applied preferential encoding to the ROI area. Hence, in recognition that the ROI 28 already may be encoded with higher quality, decoder 24 may apply additional processing power to provide preferential decoding, post-processing and/or error concealment for the non-ROI areas that did not benefit from preferential processing at the encoder side. In either case, decoder 24 may identify ROI 28 with or without assistance from ROI assistance information provided by encoder 18 or an intermediate device. Accordingly, decoder 24 may apply preferential processing in any of a variety of different contexts. Using an ROI MB map, for example, decoder 24 may distinguish ROI MBs from non-ROI MBs for purposes of preferential decoding, post-processing, and/or error concealment.

As a first alternative, encoder 18 may identify and preferentially encode ROI 28 and pass information to decoder 24 for use in assisted detection of the ROI for application of preferential decoding, post-processing and/or error concealment. As a second alternative, encoder 18 may identify ROI 28 and pass information to decoder 24 for use in assisted detection of the ROI without preferential encoding of the ROI. As a third alternative, encoder 18 may identify and preferentially encode ROI 28 without passing information to decoder 24 to assist in ROI detection. As a fourth alternative, encoder 18 may not identify an ROI and, hence, provide no preferential encoding or information to assist in ROI detection. As a fifth alternative, encoder 18 may identify ROI 28, and pass ROI assistance information to decoder 24, but not apply preferential encoding to the ROI. As sixth alternative, an intermediate device, e.g., within a network between source device 12 and destination device 14, may identify the ROI and pass ROI assistance information to decoder 24. In some examples, decoder 24 may exploit ROI assistance information from encoder 18 or an intermediate device to detect ROI 28. In other examples, decoder 24 detects ROI 28 without any assistance from encoder 18 or any intermediate device.

As mentioned above, ROI 28 may be used to specify objects other than head 36 or a face. Generally speaking, the ROI in video telephony (VT) applications can be very subjective and may differ from user to user. The desired ROI also depends on how VT is used. In some cases, VT may be used to view and evaluate objects, in contrast to videoconferencing. For example, a user may wish to focus on a section of a whiteboard containing equations or drawings, rather than a presenter's face, particularly when the presenting is facing away from the camera and toward the whiteboard. In some cases, a video scene may include two or more ROI's, which are designated for preferential encoding. To accommodate such cases, in some aspects, decoder 24 may be configured to adapt to different contexts, e.g., in response to user input indicating whether the ROI is a person or an object such as a portion of whiteboard.

Figure 3:
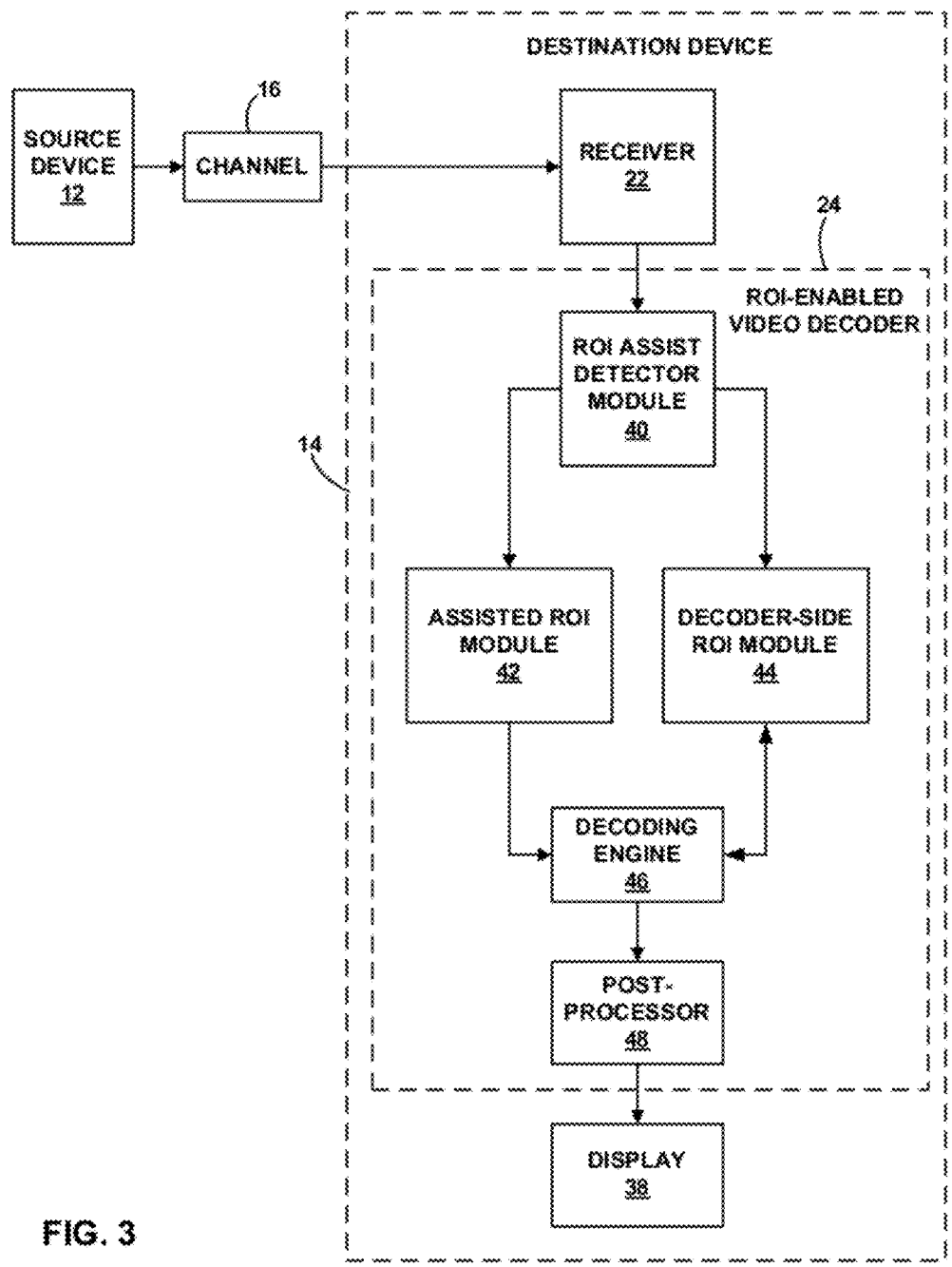
FIG. 3 is a block diagram illustrating an example of the video decoder of FIG. 1 in more detail.

FIG. 3 is a block diagram illustrating an example of ROI-enabled video decoder 24 of FIG. 1 in more detail. As shown in FIG. 3, decoder 24 includes a receiver 22 that receives encoded video data from source device 12 via channel 16. In the example of FIG. 3, ROI-enabled video decoder 24 includes ROI assist detector module 40, assisted ROI module 42, decoder-side ROI module 44, decoding engine 46, and post-processor 48. Depiction of different features as modules is intended to highlight different functional aspects of decoder 24 and does not necessarily imply that such modules must be realized by separate hardware and/or software components. Rather, functionality associated with one or more modules may be integrated within common or separate hardware and/or software components.

ROI assist detector module 40 determines whether the encoded video data or side information received from source device 12 or an intermediate device includes information to assist in ROI identification. For example, ROI assist detector module 40 may detect the presence of an ROI map, or a signal or code included in the bitstream for a given video frame or sequence of video frames. ROI-enabled video decoder 24 applies a first process to identify a region of interest (ROI) in encoded video data if the encoded video data or side information includes information to assist ROI identification. The information to assist ROI identification may include information identifying portions of the encoded video data that reside within the ROI, may indicate whether or not preferential encoding or other preferential processing has been applied to the ROI.

The first process may be performed by assisted ROI module 42, decoding engine 46 and post-processor 48. For example, assisted ROI module 42 identifies the ROI based on the information provided by encoder 18, e.g., by identifying blocks that fall within the ROI. Decoding engine 46 and post-processor 48 then apply preferential decoding, post-processing and/or error concealment to the ROI identified by assisted ROI module 42. For example, assisted ROI module 42 may generate an indication of the blocks, e.g., MBs or sub-partitions, to which preferential processing should be applied, and pass the indication to decoding engine 46 and post-processor 48. Display 38 presents a visual representation of the decoded video data produced by decoding engine 46 and post-processor 48 to the user of destination device 14.

ROI-enabled video decoder 24 applies a second process to identify the ROI in the encoded video data if the encoded video data does not include information to assist ROI identification. The second process may be performed by decoder-side ROI module 44, decoding engine 46 and post-processor 48. As will be described, decoder-side ROI module 44 may analyze the encoded video data to automatically identify the ROI without the assistance of encoder 18 or an intermediate device. In this sense, decoder-side ROI module 44 may be considered a decoder-only ROI module. Decoder-side ROI module 44 may analyze one or more characteristics of the encoded video data to determine reliability of ROI identification using bitstream domain analysis of the encoded video data.

As an illustration, decoder-side ROI module 44 may analyze one or more quantization parameter (QP) values for the encoded video data. Based on the analysis of the QP values, decoder-side ROI module 44 determines whether the ROI can be reliably extracted from the bitstream domain of the encoded video data. More particularly, decoder-side ROI module 44 may analyze average QP values for luma and chroma components of the encoded video data, and indicate unacceptable reliability when the average QP values exceed a threshold value. If the average luma and chroma QP values for a video frame are high, indicating poor quantization of transform coefficients and thus loss of important signal information such as edges, the likelihood of extracting an accurate ROI tends to be low. When QP values are high, and ROI reliability in the bitstream domain is low, it is advisable to perform ROI detection in the pixel domain rather than the bitstream domain.

To that end, decoder-side ROI module 44 may be configured to apply bitstream domain ROI detection when reliability is acceptable and pixel domain ROI detection when reliability is unacceptable. When pixel-based ROI extraction is applied, decoder-side ROI module 44 may interact with decoding engine 46 so that ROI extraction can be applied to the decoded bitstream. When bitstream domain ROI detection is applied, decoder-side ROI module 44 may apply two different ROI detection paths for intra- and inter-coded video data, as mentioned previously. Each path may include two different stages that produce coarse and fine ROI estimates, respectively. Decoder-side ROI module 44 passes the fine ROI indication, for each video frame or a sequence of video frames, to decoding engine 46 and post-processor 48. Using the ROI indication, decoding engine 46 and post-processor 48 apply preferential decoding, post-processing and/or error concealment to the ROI identified in the video data. Display 38 presents a visual representation of the decoded video data produced by decoding engine 46 and post-processor 48 to the user of destination device 14.

ROI assist detector module 40, as discussed above, determines whether encoder 18 or an intermediate device has included any information in the encoded video bitstream, or any out-of-band side information, for assistance in ROI extraction. If so, ROI assist detector module 40 determines that information to assist ROI identification is available. As one example, ROI assist detector module 40 may analyze the received video bitstream to determine whether a signal, code or unique pattern is present. A unique pattern may be used to signal that encoder 18 or an intermediate device has performed an ROI extraction at the encoder side. The pattern may be chosen such that it does not occur, or very rarely occurs, in real encoded video data. For instance, a pattern of 1000100010001000 may be embedded within the encoded video bitstream to indicate that information is available to assist decoder 24 in extracting the ROI.

The embedding of the pattern can be done using an odd-even method, e.g., as described in M. Wu, H. Yu and A. Gelman, "Multi-level data hiding for digital image and video," SPIE, Vol. 3854, 1999. For example, the data can be embedded in the non-zero quantized AC coefficients of the encoded video bitstream. If a bit to be embedded is "0," for example, the quantized AC coefficient is changed to an even number; otherwise, the AC coefficient is changed to an odd number. By looking at the first sixteen AC coefficients of an encoded video frame, the intended signal can be decoded. If the pattern 1000100010001000 is observed, decoder 24 can infer that encoder 18 has embedded information to assist the decoder in identifying the ROI. Decoder 24 processes the video bitstream to obtain the assistance information if the pattern is detected. If there is no pattern in the bitstream, however, then decoder 24 defaults to a decoder-side ROI scheme.

Decoder 24 may be configured to handle varying levels of ROI assistance information from encoder 18 or an intermediate device. Once ROI assist detector module 40 has detected an assistance signal, code or pattern, the ROI assist detector module also may detect an assistance mode, which may be indicated by another pattern in the encoded video bitstream. For example, encoder 18 may provide ROI assistance information pursuant to a chroma threshold mode or a complete macroblock (MB) level map mode. If encoder 18 performs a sensor-based ROI extraction, for example, it can transmit the threshold range for the chroma values that would be classified as ROI. The chroma threshold range may correspond to a range of skin tone values that correlate with the ROI. In this case, ROI assist detector module 40 detects the chroma threshold mode based on a pattern in the bitstream, and instructs assisted ROI module 42 to apply the threshold range of chroma values to identify the ROI.

Alternatively, encoder 18 or an intermediate device may send a complete MB level ROI map. In this case, for each MB in a video frame, a flag may be set to 1 if the MB is part of the ROI, or otherwise set to 0 if the MB is not part of the ROI. This MB ROI map information can also be embedded into the data stream using any of a variety of techniques, such as the odd-even method as described above. If ROI assist detector module 40 detects the MB level map mode based on a pattern in the bitstream, it instructs assisted ROI module 42 to use the MB ROI map information to identify the ROI. In either case, i.e., chroma threshold mode or MB level map mode, assisted ROI module 42 produces an ROI identification for use by decoding engine 46 and post-processor 48 in applying preferential decoding, post-processing, and/or error concealment to the ROI. Alternatively, if ROI assist detector module 40 does not detect an encoder assistance signal in the compressed video bitstream, it determines that information to assist ROI identification is not available. In this case, ROI-enabled video decoder 24 defaults to a decoder-side ROI extraction process, e.g., as applied by decoder-side ROI module 44.

Figure 4:
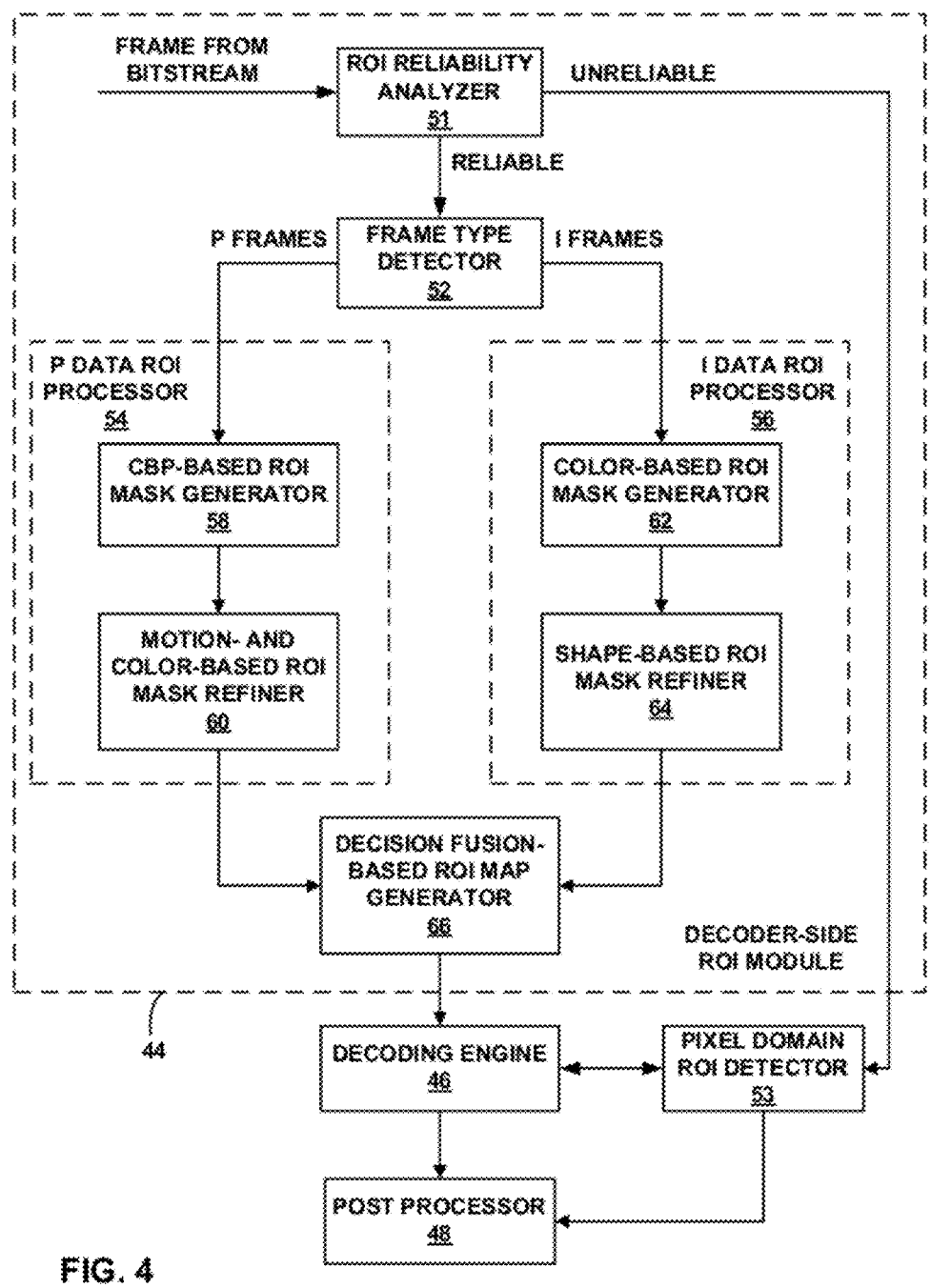
FIG. 4 is a block diagram illustrating a decoder-side ROI module forming part of the video decoder of FIG. 3.

FIG. 4 is a block diagram illustrating decoder-side ROI module 44 forming part of ROI-enabled video decoder 24 of FIG. 3. In the example of FIG. 4, decoder-side ROI module 44 may include an ROI reliability analyzer 51, frame type detector 52, pixel domain ROI detector 53, P data ROI processor

54, I data ROI processor 56, and decision fusion-based ROI map generator 66. P data ROI processor 54 may include coded block pattern (CBP)-based ROI mask generator 58 and motion- and color-based ROI masker refiner 60. Again, depiction of different features as modules is intended to highlight different functional aspects of decoder 24 and does not necessarily imply that such modules must be realized by separate hardware and/or software components. I data ROI processor 56 may include color-based ROI mask generator 62 and shaped-based ROI mask refiner 64. When reliability of bitstream domain ROI detection is acceptable, decoder-side ROI module 44 provides an ROI indication to decoding engine 46 and post processor 48. Alternatively, when reliability of bitstream domain ROI detection is not acceptable, decoding engine 46 decodes the video and applied ROI detection in the pixel domain.

Upon receipt of a video frame in the bitstream of encoded video data, ROI reliability analyzer 51 determines whether ROI detection in the bitstream domain is likely to be accurate and therefore reliable. Based on pre-analysis of ROI reliability, ROI reliability analyzer 51 is able to direct either bitstream domain ROI extraction or reconstructed pixel domain ROI extraction at the decoder side. If ROI reliability analyzer 51 analyzes the incoming bitstream and finds that the ROI extraction reliability is rather high, then a low-complexity compressed-bitstream domain ROI detection approach can be used. Due to lower complexity, ROI extraction in the bitstream domain is desirable. If ROI reliability analyzer finds that ROI extraction reliability is not high, then the higher complexity reconstructed pixel domain ROI detection approach is used. For ROI reliability analysis, ROI reliability analyzer may use a combination of the luma and chroma QP values. For example, the ROI extraction reliability may be computed using the average QP values for the video frame.

If the average luma and chroma QPs for the video frame are too high, i.e., above a predetermined threshold, then the ROI extraction in the bitstream domain is expected to be poor. In this case, ROI reliability analyzer 51 indicates unreliable ROI extraction and directs pixel domain ROI detector 53 to extract the ROI in the reconstructed pixel domain. If the average luma and chroma QPs for the video frame do not exceed the predetermined threshold, then ROI extraction in the bitstream domain is expected to be acceptable. In this case, ROI reliability analyzer 51 indicates reliable ROI extraction and directs bitstream domain ROI extraction, e.g., by causing Frame type detector 52 to commence decoder-side ROI bitstream processing.

Hence, the reliability analysis applied by ROI reliability analyzer 51 permits lower complexity processing in some circumstances in which the resulting ROI will be effective, but directs higher complexity processing in the reconstructed pixel domain in other circumstances in which the resulting ROI is likely to be less accurate. In this example, the average QP values serve as an indication of encoded video content that would thwart the effectiveness of the bitstream domain ROI extraction. Adaptive ROI detection in either the bitstream or pixel domain based on ROI reliability can effectively balance the tradeoff of processing time consumption and detection accuracy, and dynamically determines if the detection can be reliably performed in compressed-domain or pixel-domain. The ROI reliability analysis may impose the added cost of pixel domain ROI extraction only when necessary to avoid erroneous ROI extraction.

In the example of FIG. 4, ROI reliability analyzer 51 resides within decoder-side ROI module 44. As an alternative, the reliability analysis could be performed by encoder 18 or an intermediate device. For example, a reliability indication could be transmitted with the encoded video bitstream or as out-of-band side information by encoder 18 or an intermediate device. In either case, decoder-side ROI module 44 could use the received reliability information to direct either bitstream domain ROI extraction or pixel domain ROI extraction.

As further shown in FIG. 4, if ROI extraction in the bitstream domain is deemed reliable by ROI reliability analyzer 51, frame type detector 52 determines which of two processing paths to apply. In particular, frame type detector 52 selects I data ROI processor 56 if the video frame is an intra-coded (I) frame and selects P data ROI processor 54 if the video frame is an inter-coded (P or B) frame. In many cases, however, a P frame may include both inter-coded MBs and intra-coded MBs. If a P frame includes a significant number of intra-coded MBs, frame type detector 52 may direct that the intra-coded MBs be processed by I data ROI processor 56 and the inter-coded MBs be processed by P data ROI processor 54.

For example, combined processing via both I data ROI processor 56 and P data ROI processor 54 may be applied to a P frame if the number of intra-coded MBs exceeds a predetermined threshold. In this case, decision fusion-based ROI map generator 66 may combine ROI map information produced by I data ROI processor 56 for intra-coded MBs and ROI map information produced by P data ROI processor 54 for inter-coded MBs. If a P frame does not include a number of intra-coded MBs that exceeds the threshold, however, the P frame may be processed only by P data ROI processor 54.

For each processing path, I frame or P frame processing, decoder-side ROI module 44 applies a two-stage process including a first stage to produce a coarse ROI and a second stage that refines the coarse ROI to produce a final ROI. The processing paths work differently for I frames and P frames. For intra-coded data, such as I frames or intra-coded MBs from P frames with a significant number of intra-coded MBs, I data ROI processor 56 applies a color-based ROI mask generator 62 as a first stage and a shape-based ROI mask refiner 64 as a second stage. For P frames or inter-coded MBs from P frames with a significant number of inter-coded MBs, P data ROI processor 54 applies a CBP-based ROI mask generator 58 and a motion- and color-based ROI mask refiner 60. The hybrid, two-stage ROI detection in the I frame domain and P frame domain may have the advantage of scalability, e.g., using the CBP information to conduct a quick round detection.

For processing of intra-coded data, color-based ROI mask generator 62 analyzes the video frame in the bitstream domain and produces a coarse ROI "mask" indicating the ROI. Color-based ROI mask generator 62 may be configured to identify ROI macroblocks (MBs) based on a chroma DC component of the video frame. Chroma components of skin regions fall within a well defined region in the color space. This information can be exploited to produce a threshold that can be applied to the DC values of the Cr (red chrominance) and Cb (blue chrominance) blocks in a given MB. If the DC values of the Cr and Cb blocks in a given MB fall within a given skin tone range, the MB is marked with a "1" to indicate that it is part of the ROI.

For example, if the Cr DC value, DC(Cr), falls between the low Cr skin tone threshold, Th_Cr_low, and the high Cr skin tone threshold, Th_Cr_high, and the Cb DC value, DC(Cb), falls between the low Cb skin tone threshold, Th_Cb_low, and the high Cb skin tone threshold, Th_Cb_high, as follows:

$$Th\_Cr\_low < DC(Cr) < Th\_Cr\_high$$

$$Th\_Cb\_low < DC(Cb) < Th\_Cb\_high$$

then the MB is marked as part of the ROI, e.g., with a 1 instead of a 0. If the MB falls outside the range, it may be marked with a zero to indicate a non-ROI MB. This example pertains to ROI detection based on skin tone range or other color range analysis. For different types of ROI's, such as whiteboard regions, moving objects, or the like, alternative techniques (including, for instance, alternate color thresholds) for ROI extraction may be applied.

Hence, in this example, color-based ROI mask generator 62 may produce a binary ROI map that assigns 1's and 0's to respective MBs within a video frame. Once the binary ROI map has been obtained for a video frame, color-based ROI mask generator 62 may identify clusters having contiguous MBs marked with 1's. Color-based ROI mask generator 62 may fill in the clusters using morphological operators such as closing operations. In other words, if a respective cluster includes MB's marked with 0's, color-based ROI mask generator 62 may change the 0's to 1's such that all MB's within the cluster are commonly identified as being within the ROI. The result of the clusters is a set of potential ROI regions that can be refined in the second stage of the process, as provided by shape-based ROI mask refiner 64.

Figure 5:
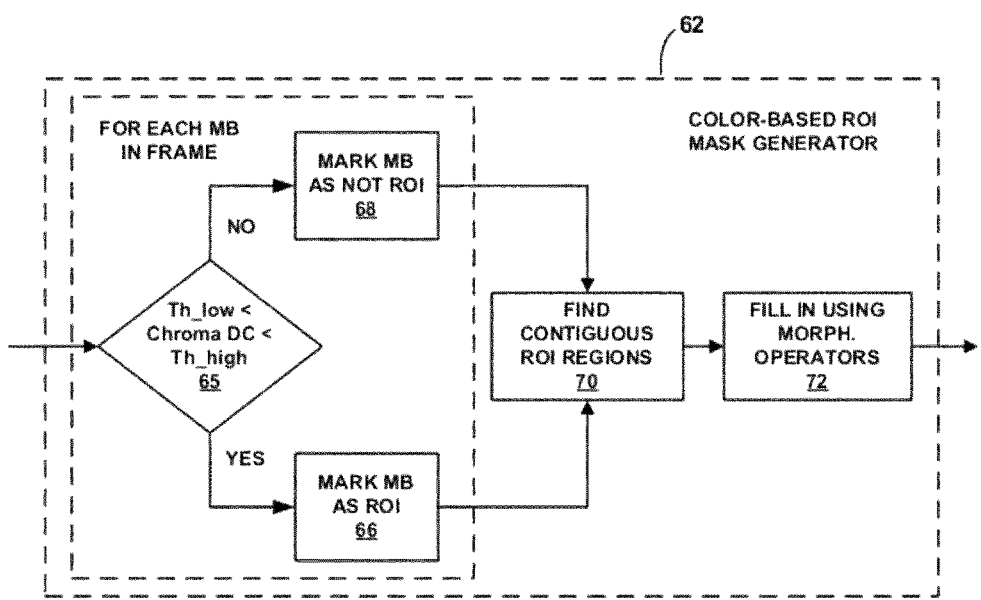
FIG. 5 is a flow diagram illustrating operation of a color-based ROI mask generator forming a first stage of an I data ROI processor in the decoder-side ROI module of FIG. 4.

FIG. 5 is a flow diagram illustrating exemplary operation of color-based ROI mask generator 62 of FIG. 4. As shown in FIG. 5, color-based ROI mask generator 62 applies a threshold comparison (65) as described above. In particular, the threshold comparison determines whether DC chroma values (Chroma DC) for a given MB fall within a range defined by a low chroma value threshold Th_low and a high chroma value threshold Th_high. Again, as discussed above, the DC chroma value comparison may involve separate comparisons of DC chroma values for red chrominance (Cr) and blue chrominance (Cb).

If the applicable DC chrominance values for an MB fall within the applicable range, color-based ROI mask generator 62 concludes that the MB is an ROI MB and marks the MB as part of the ROI, e.g., with a "1" (66). If the comparison shows that the DC chrominance values for the MB are not within the applicable range, then color-based ROI mask generator 62 marks the MB as not ROI, e.g., with a "0" (68). The ROI marking process may be carried out for each MB in an applicable video frame, resulting in an ROI map that identifies MB's as either in the ROI or not in the ROI.

Upon completion of the ROI marking process (65, 66, 68), color-based ROI mask generator 62 finds contiguous ROI regions (70), e.g., regions within the video frame in which contiguous MBs are marked as ROI. The contiguous regions may include some MBs that are not identified as ROI, creating small holes. In this case, color-based ROI mask generator 62 fills in the holes using morphological operators (72) such as close operations. Color-based ROI mask generator 62 may fill in the holes by changing the marking of non-ROI MBs in the ROI contiguous regions as ROI MBs, e.g., by changing the non-ROI "0" flag to the ROI "1" flag for MBs residing within a contiguous ROI region. Then, color-based ROI mask generator 62 passes the resulting MB map or "mask" to the next stage of the I frame processing path.

Figure 6:
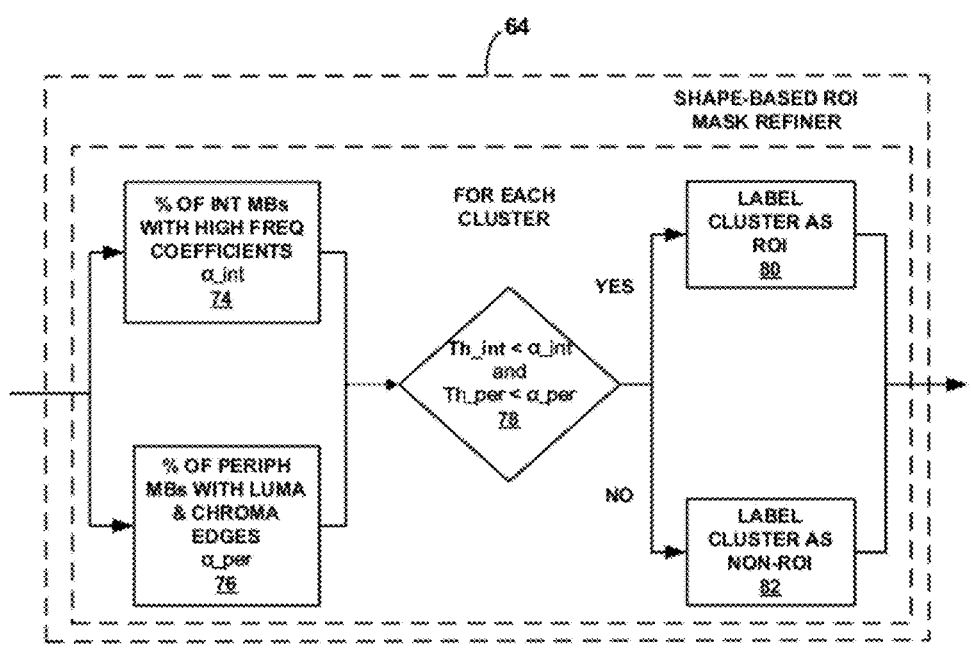
FIG. 6 is a flow diagram illustrating operation of a shape-based ROI mask refiner forming a second stage of the I data ROI processor of the decoder-side ROI module of FIG. 4.

In particular, with further reference to FIG. 4, color-based ROI mask generator 62 passes the ROI to shape-based ROI mask refiner 64, which processes the coarse ROI defined by color-based ROI mask generator 62 to produce a fine ROI map. FIG. 6 is a flow diagram illustrating exemplary operation of shape-based ROI mask refiner 64 forming a second stage of I data ROI processor 56 of the decoder-side ROI module 44 of FIG. 4. Shape-based ROI mask refiner 64 refines the coarse ROI map obtained in the first stage using shape constraints. The shape constraints may focus on a combination of edges, (e.g., both luma and chroma edges), around the periphery of the coarse ROI region and a non-smooth interior. These constraints can be modified according to the expected shape of the desired ROI region. If the ROI is a face region, the face region usually has a distinct boundary that can be readily identified by analysis of luma and chroma edges around the periphery of a cluster of MBs identified as being with the ROI, i.e., a coarse ROI MB cluster.

Identification of the face region can be performed using any of a variety of edge detection techniques. For example, suitable edge detection techniques are described in B Shen, I K Sethi, "Direct feature extraction from compressed images," Proceedings of SPIE, 1996, March 1996, pp. 404-414, and in Wenyin Zhang, Jianguo Tang, and Chao Li, "The Extraction of Image's Salient Points for Image Retrieval," Fuzzy Systems and Knowledge Discovery 2005, LNAI 3613, pp. 547-556, 2005. Alternatively, identification of a face region can be performed using a heuristic technique that associates an edge of a coarse ROI MB cluster with a block if it has more than a specified number of high-frequency texture coefficients. In addition to edges, faces are expected to have eyes, a nose and other features that cause interiors to be non-smooth, as opposed to a piece of wood that can detected as ROI due to color. Accordingly, a non-smooth interior constraint can be imposed by comparing the number of MBs in the cluster having high frequency coefficients to a threshold.

As shown in FIG. 6, in one example, shape-based ROI mask refiner 64 may determine a percentage of interior MBs having high frequency coefficients within a coarse ROI MB cluster (75). This percentage may be expressed as $\alpha_{int}$. In addition, shape-based ROI mask refiner 64 may determine a percentage of peripheral MBs with luma and chroma edges (76). This percentage may be expressed as $\alpha_{per}$. If the interior percentage $\alpha_{int}$ is greater than an applicable threshold Th_int, and the peripheral percentage $\alpha_{per}$ is greater than an applicable threshold Th_per (78), then shape-based ROI mask refiner 64 labels the applicable cluster as an ROI cluster (80). If one or both of the percentages do not exceed the pertinent thresholds (78, 80), then shape-based ROI mask refiner 64 labels the applicable cluster as a non-ROI cluster (82).

Shape-based ROI mask refiner 64 applies the process illustrated in FIG. 6 to each coarse ROI MB cluster in the video frame and thereby refines the ROI map produced by color-based ROI mask generator 62 to produce a fine ROI map. Then, shape-based ROI mask refiner 64 passes the fine ROI map to decision fusion-based ROI map generator 66 (FIG. 4) to produce the final ROI map for use by decoding engine 46 and post processor 46 in applying preferential decoding, post processing and/or error concealment. Decision fusion-based ROI map generator 66 receives the ROI map produced by I data ROI processor 56 or the ROI map produced by P data ROI processor 54 and outputs the appropriate ROI map depending on whether the current frame is an I frame or a P frame. The resulting ROI map may simply be another map of MBs with ROI and non-ROI flags, e.g., 1's and 0's. Alternatively, the ROI map may have other formats.

In some cases, decision fusion may be configured to handle processing of some MBs of a video frame via P data ROI processor 54 and other MBs of the same video frame via I data ROI processor 56. For example, some P frames may have a significant number of intra-coded MBs, in addition to the predominance of inter-coded MBs. In this case, frame type detector 52 may be configured to determine whether a P frame has more than a threshold level of intra-coded MBs. If so, intra-coded MBs for a given frame can be passed through I data ROI processor 56 and inter-coded MBs for the same frame can be passed through P data ROI processor 54. Decision fusion-based ROI map generator 66 then may compose a combined ROI map using ROI information obtained from both processing paths, i.e., P data ROI processor 54 and I data ROI processor 56. In particular, the combined map produced by decision fusion-based ROI map generator may include markings applied to intra-coded MBs by I data ROI processor 56 and ROI markings applied to inter-coded MBs by P data ROI processor 54 for a given frame.

With further reference to FIG. 4, if frame detector 52 indicates that the current video frame is a P frame, then P data ROI processor 54 generates the coarse and fine ROI maps for the video frame. CBP-based ROI mask generator 58 analyzes coded block patterns (CBPs) associated with the video frame to identify a coarse ROI. Motion- and color-based ROI mask refiner 60 then applies motion and color constraints to refine the coarse CBP-based ROI map. Hence, P data ROI processor 54 provides a separate path for ROI map generation, while CBP-based ROI mask generator 58 and motion- and color-based ROI mask refiner 60 provide first and second stages, respectively, of that path.

For CBP-based ROI mask generation, it may be assumed that encoder 18 provides reasonable performance in motion estimation. In this manner, it may be assumed that motion vectors have at least an acceptable degree of accuracy. Such an assumption is made possible for current advanced video CODECs, such as CODECs conforming to the ITU H.264 standard, which supports half-pixel or even quarter-pixel level motion estimation. In addition, in head-and-shoulder ROI video applications, such as video telephony, the ROI generally encompasses the moving head. In this setting, changes in facial expression can be captured effectively by the CBP value coded by encoder 18. Consequently, a constraint can be imposed on the CBP of the MB to determine the areas of the frame that have changed and hence have some importance. In other words, if the CBP indicates substantial change in a MB, CBP-based ROI mask generator 58 identifies the MB as part of the ROI on the premise that such changes are likely to be cause by changing facial expressions or head movement. Other MBs that are not coded, or are minimally coded, do not contain much new information as compared to the previous frame and need not be considered for the ROI computation.

For each MB in the frame, CBP involves the 4 luma blocks, and the Cr and Cb block. If two or more of the luma (Y) blocks are coded, then CBP-based ROI mask generator 58 considers the luma of the MB to be coded, as indicated in Table 1 below. The CBP can be ranked using the scheme shown in Table 1. Using the ranking scheme, CBP-based ROI mask generator 58 forms ROI clusters from MBs with CBPs conforming to the top two rank levels within a frame, provided the clusters are significant in that they include more than a minimum number of MBs. Per Table 1, if an MB has two or more luma blocks coded, and both chroma blocks (Cb or Cr) are coded, it has a rank of 1. If two or more luma blocks are coded, and at least one of the chroma blocks is coded, the MB has a rank of 2.

Only MBs having the two highest ranks within a given frame are considered to be ROI MBs. For example, if the two highest ranks of CBP's for MBs in the frame are 1 and 2, then an MB must have a CBP of rank 1 or 2 to be designated as an ROI MB. As another example, if the two highest ranks of CBP's for MBs in a given frame are 2 and 3, then an MB must have a CBP of rank 2 or 3 to be designated as an ROI MB. In addition, as mentioned above, only significant clusters are considered in any rank. These clusters can then be processed using morphological operators to close holes. The MBs in the clusters are marked with a "1" to indicate that they are part of the initial, coarse ROI. Other MBs, e.g., with lower ranks below the two highest ranks for the particular frame, are marked with "0" to indicate non-ROI MBs.

TABLE 1

CBP Table

| | Y (luma coded for 2 or more blocks) | Cb | Cr | Rank |
|---|---|---|---|---|
| 1 | 1 | 1 | 1 | 1 |
| 2 | 1 | 1 | 0 | 2 |
| 3 | 1 | 0 | 1 | 2 |
| 4 | 1 | 0 | 0 | 3 |
| 5 | 0 | 1 | 1 | 4 |
| 6 | 0 | 1 | 0 | 5 |
| 7 | 0 | 0 | 1 | 5 |
| 8 | 0 | 0 | 0 | 6 |

Figure 7:
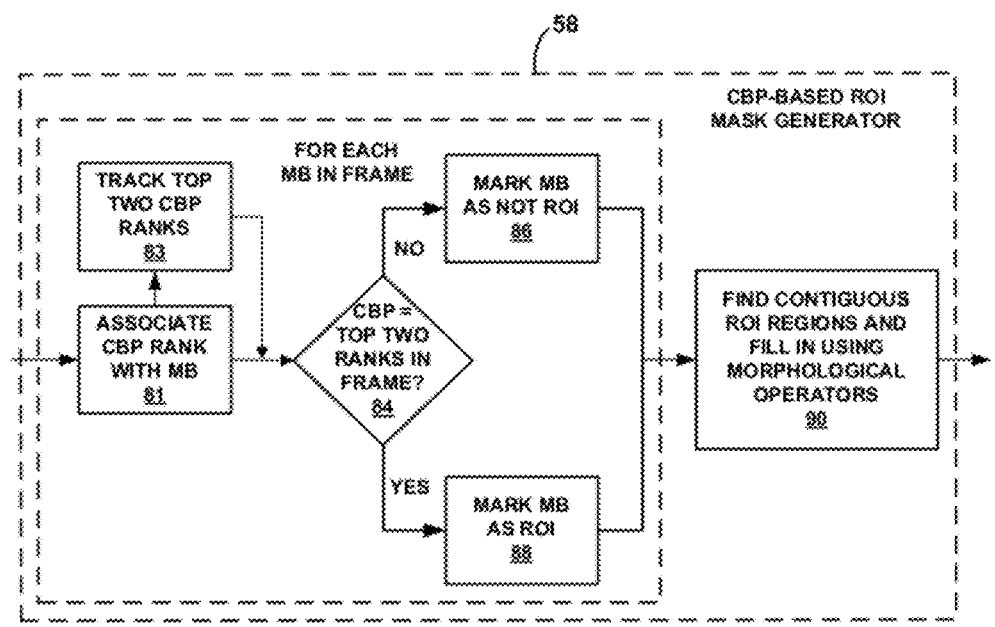
FIG. 7 is a flow diagram illustrating operation of a CBP-based ROI mask generator forming a first stage of a P (or B) data ROI processor of the decoder-side ROI module of FIG. 4.

FIG. 7 is a flow diagram illustrating operation of a CBP-based ROI mask generator 58 of FIG. 4. As shown in FIG. 7, CBP-based ROI mask generator 58 associates the CBP rank for a given MB (81) according the scheme in Table 1. The two highest ranks in the given frame are considered and are tracked from frame to frame (83). For instance, if there are significant clusters with MBs of rank 2, 3 and 4, then the clusters with the top two ranks (2 and 3) as are designated as ROI clusters. Accordingly, the highest two ranks to qualify an MB as ROI need not always be ranks 1 and 2. Rather, the highest two ranks may vary from frame to frame according to content. Also, significant clusters of MBs are considered in order to designate the two highest ranks. For example, if a frame includes only a small number of MBs with rank 1, i.e., no cluster or an insignificant cluster, the top rank will not be declared to be 1. Rather, in this example, several MBs must have a given rank in order to be considered for purposes of setting the top two ranks for a given frame.

If an MB has one of the top two CBP ranks (84), CBP-mask generator 58 marks the MB as an ROI MB, e.g., with a "1." If an MB has a CBP below the top two ranks, the MB is marked as Not ROI (86), e.g., with a "0" flag. CBP-based ROI mask generator 58 continues to mark each of the MBs in the video frame as ROI or Not ROI based on the applicable CBP of the MB in relation to the top two CBP ranks for the frame. After all MBs have been marked, CBP-based ROI mask generator 58 finds contiguous ROI regions, i.e., regions in which contiguous MBs are marked as ROI MBs, and fills in any holes in the contiguous regions using morphological operators such as close functions (90). At this point, CBP-based ROI mask generator 58 passes the resulting coarse ROI map to motion- and color-based ROI mask refiner 60 for further refinement.

Motion- and color-based ROI mask refiner 60 can refine the ROI from CBP-based mask generator 58 using DC chroma values and motion vector consistency. For example, using the motion compensated DC chroma value from the previous frame, motion- and color-based mask refiner 60 can search for MBs that have colors matching a specified skin tone range. In addition, it is reasonable to assume that a majority of the MBs in a human face region will undergo similar motion, as they have been produced by the motion of a 3D rigid body through space. The motion is approximately in the same direction or to the same extent, because for rotational motion, the motion vector magnitudes may vary, but the angles are similar. Exceptions are the mouth region and around the eyes or other facial features. However, ROI mask refiner 60 can evaluate motion consistency of a majority of the blocks and ensure that they are similar.

For example, ROI mask refiner 60 may compute the standard deviation of the angle and magnitude of the motion vectors in a coarse ROI MB cluster and ensure that it is small compared to the mean. In one example, this operation may be represented by verifying that the ratio of the standard deviation $\sigma_{angle}$ for the motion vector angle to the mean of the motion vector angle $\mu_{angle}$ is less than 0.2, or that the ratio of the standard deviation $\sigma_{mag}$ for the motion vector magnitude to the mean $\mu_{mag}$ of the motion vector magnitude is less that 0.2, e.g., as follows:

$$[\sigma_{angle}/\mu_{angle}<0.2]$$

OR $$[\sigma_{mag}/\mu_{mag}<0.2]$$

Using the DC chroma values and motion vector (MV) consistency, ROI mask refiner 60 determines whether to retain a coarse MB in the fine MB ROI, or change the status of the MB to Not ROI.

Figure 8:
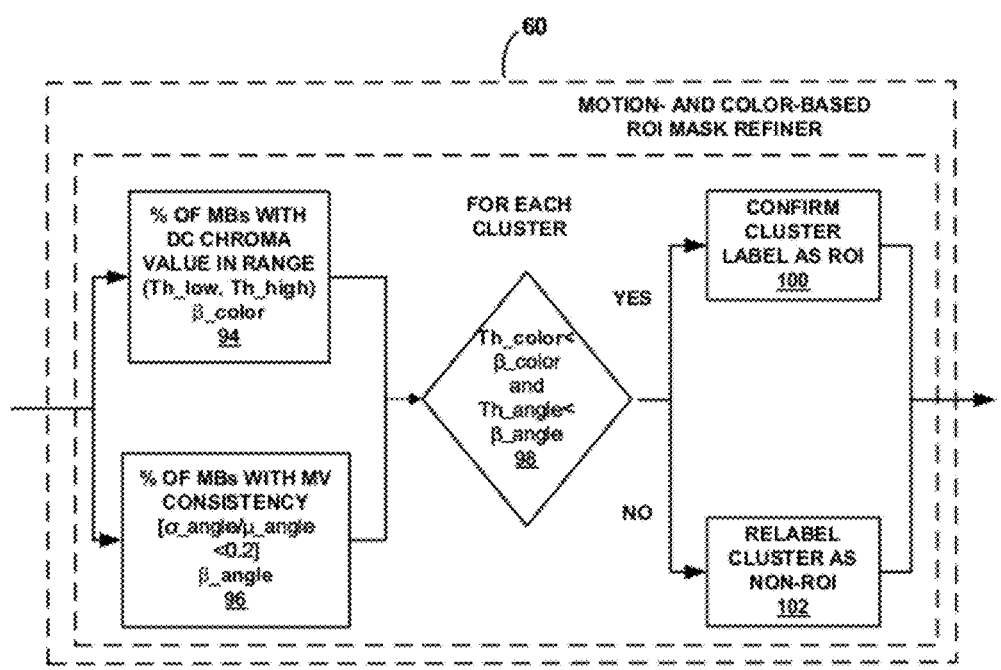
FIG. 8 is a flow diagram illustrating operation of a motion- and color-based ROI mask refiner forming a second stage of a P (or B) data ROI processor of the decoder-side ROI module of FIG. 4.

FIG. 8 is a flow diagram illustrating operation of a motion- and color-based ROI mask refiner 60. As shown in FIG. 8, ROI mask refiner 60 may be configured to determine the percentage (β_color) of MBs in a cluster with DC chroma values in range (94), i.e., between a low threshold Th_low and a high threshold Th_high. In addition, ROI mask refiner 60 may be configured to determine the percentage (β_angle) of MBs with MV consistency in range (96), e.g., with a ratio of the standard deviation $\sigma_{angle}$ for the motion vector angle to the mean of the motion vector $\mu_{angle}$ is less than 0.2. If β_color is greater than an applicable DC chroma value threshold (Th_color) and β_angle is greater than an applicable MV consistency (Th_angle), ROI mask refiner 60 confirms that the cluster should be labeled as ROI (100). If not, then ROI mask refiner 60 relabels the cluster as Non-ROI (102).

ROI mask refiner 60 performs this process for each cluster that has been labeled as a coarse ROI cluster within the video frame. The result is a fine ROI map that identifies the clusters of MBs that fall within the ROI. Motion- and color-based ROI mask refiner 60 passes the refined ROI map to decision fusion-based ROI map generator 66, which produces the final ROI map for use by decoding engine 46 and post processor 48. In particular, decoding engine 46 and post processor 48 may apply preferential decoding, post processing and/or error concealment to the ROI MBs identified by the ROI map to improve visual quality relative to non-ROI MBs.

With reference to FIG. 4, if ROI reliability analyzer 51 indicates that ROI extraction in the bitstream domain is likely to be reliable, P data ROI processor 54 and I data ROI processor 56 process video frames to detect the ROI and formulate an ROI map. If ROI extraction in the bitstream domain is not likely to be reliable, however, pixel domain ROI detector 53 performs ROI extraction in the pixel domain. For example, pixel domain ROI detector 53 may interact with decoding engine 46 to receive decoded pixel domain video data. Decoding engine 46 performs decoding of the encoded video bitstream and produces pixel domain data for used by pixel domain ROI detector 53.

Pixel domain ROI detector 53 may apply skin tone detection or other techniques to identify the ROI using the pixel data obtained from decoding engine 46. In addition, pixel domain ROI detector 53 may apply shape-based operations to refine or verify an initial skin tone-based ROI map. Post processor 48 receives the pixel domain ROI map from ROI detector 53, and uses the map to apply preferential post processing and/or error concealment. Hence, when pixel domain ROI analysis is required, the encoded video is decoded to produce the pixel domain data. Consequently, preferential decoding may not be possible when pixel domain ROI detection is required to a video frame. However, advantages can still be obtained by post processing, error concealment or both.

Any of a variety of pixel domain ROI detection techniques may be applied by pixel domain ROI detector 53. In general, pixel domain ROI detection is more computationally intensive than bitstream domain ROI detection, and increases power consumption. Accordingly, bitstream ROI detection is more desirable from a complexity and power consumption standpoint. However, ROI reliability analyzer 51 causes decoder 24 to switch from bitstream domain ROI detection to pixel domain ROI detection when bitstream domain ROI detection is not likely to produce acceptable results. In this manner, ROI reliability analyzer balances computational overhead and power consumption versus visual quality.

Figure 9:
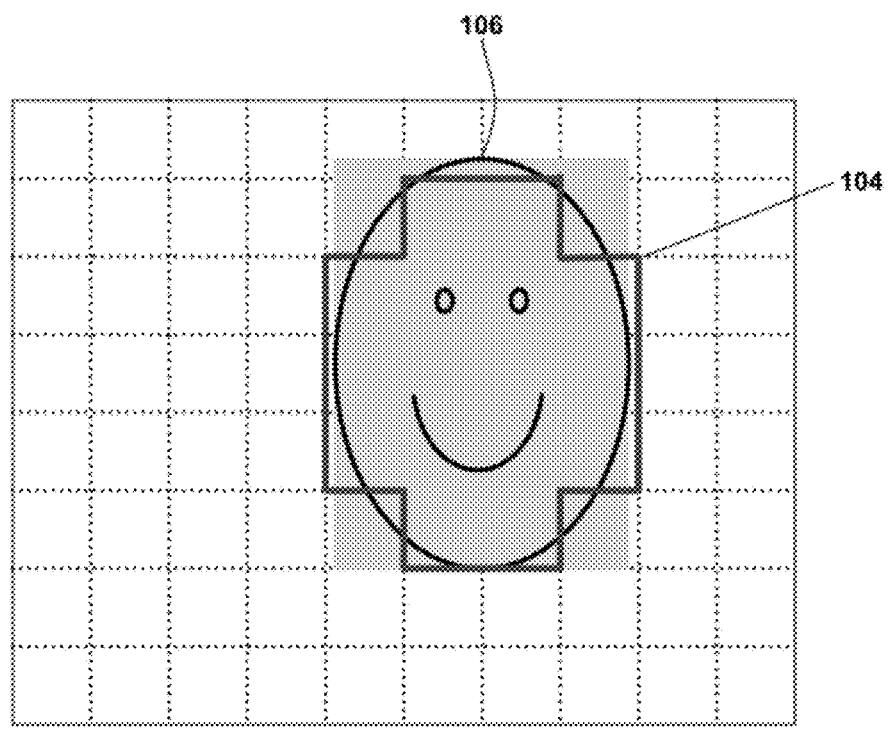
FIG. 9 is a diagram illustrating an example macroblock (MB) map for an ROI in a video frame.

FIG. 9 is a diagram illustrating an example macroblock (MB) map for an ROI in a video frame. In the example of FIG. 9, the ROI 104 is associated with a human face 106 and includes a group of contiguous MBs that at least partially overlap with a portion of the face. Again, other objects or multiple objects, including multiple human faces, may be the subject of the ROI. For VT and other applications in which human interaction is involved, however, detection of human face 106 as the ROI will be most prevalent. MBs within the boundary defined by ROI 104 are marked as ROI MBs, e.g., with a "1." The individual MBs are identified by the blocks defined by the grid lines in FIG. 9. By marking the MBs as either ROI or non-ROI MBs, preferential decoding, post-processing and/or error concealment can be applied to the ROI MBs to enhance visual quality. In this manner, the viewer is better able to observe facial expressions or other characteristics of the ROI.

The diagram of FIG. 9 illustrates refinement of the ROI from the first stage, i.e., CBP-based ROI mask generator 58, using the DC chroma value and MV consistency. Using the motion compensated DC chroma value from the previous frame N−1, motion- and color-based ROI mask refiner 60 identifies MBs in the present frame N that have colors matching a specified skin tone range. On this basis, ROI mask refiner 60 confirms or changes, based on chroma value, the ROI status of ROI MBs identified by CBP-based ROI mask generator based on CBP rank.

FIG. 10 is a diagram illustrating definition of an ROI in a P frame. The diagram of FIG. 10 illustrates ROI refinement using MV consistency. In the example of FIG. 10, Frame N relies on a reference frame N−1. Between reference frame N−1 and frame N, there is substantial movement of human face 106. The motion vector MV shows motion between a block 108A in frame N and a corresponding MB 108B in the previous frame N−1. Motion- and color-based ROI mask refiner 60 analyzes the consistency of MVs for MBs within the same ROI cluster as MB 108A. Again, the movement of any block corresponding to face 106 should be similar because the entire face tends to move as one object. If the standard deviation of the angle and magnitude of the MVs for the MBs in the ROI is small compared to the mean values, then MV consistency is assured, and the ROI MBs are maintained as ROI MBs. If MV consistency is not present, then some of the MBs may be marked as non-ROI MBs if their MVs are outliers and contribute to the lack of MV consistency. The corresponding MB (CMB) in FIG. 10B is the MB in the previous frame that is the closest match, e.g., based on squared error, to the MB 108A under consideration in the current frame (108A). As the motion is not necessarily in terms of the MB length (16 pixels), the CMB can appear anywhere in the previous frame. So, if the motion vector MV is known, the location in the previous frame that looks most similar to the current MB can be identified.

Figure 11A:
FIGS. 11A and 11B are diagrams illustrating a first video scene and correlation of CBP values to an approximate ROI in the video scene.
Figure 11B:
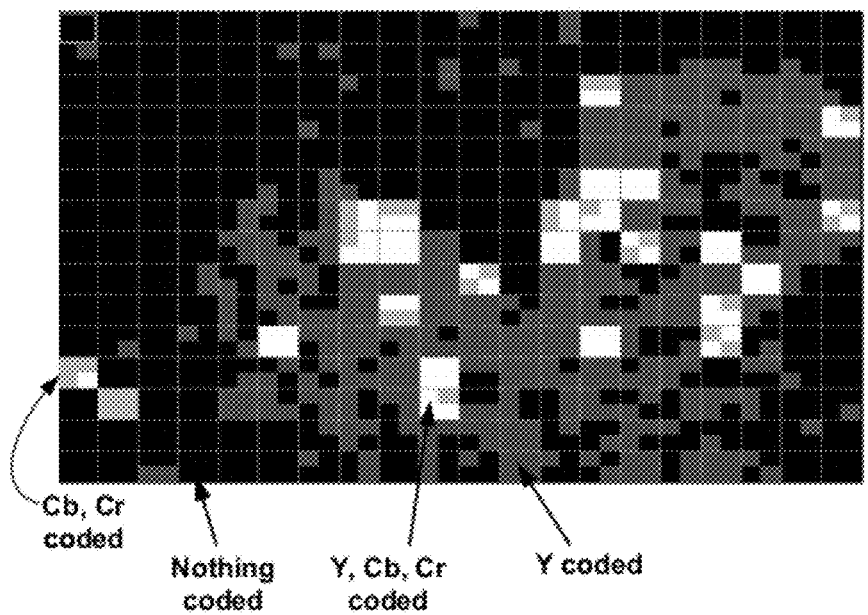
Figure 12A:
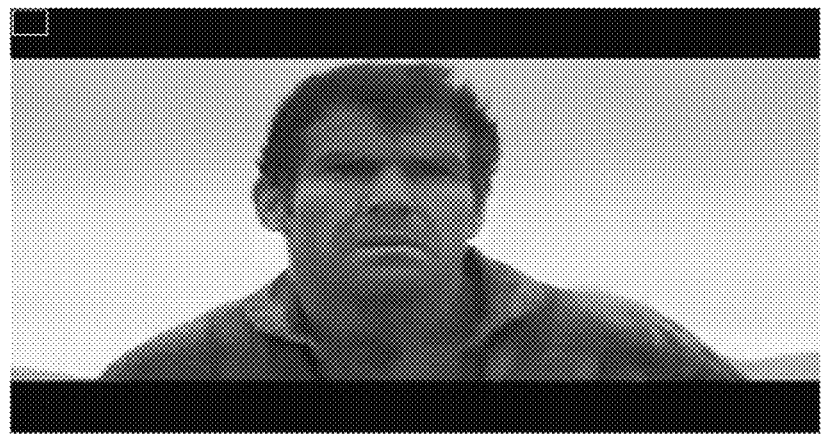
FIGS. 12A and 12B are diagrams illustrating a second video scene and correlation of CBP values to an approximate ROI in the second video scene.
Figure 12B:
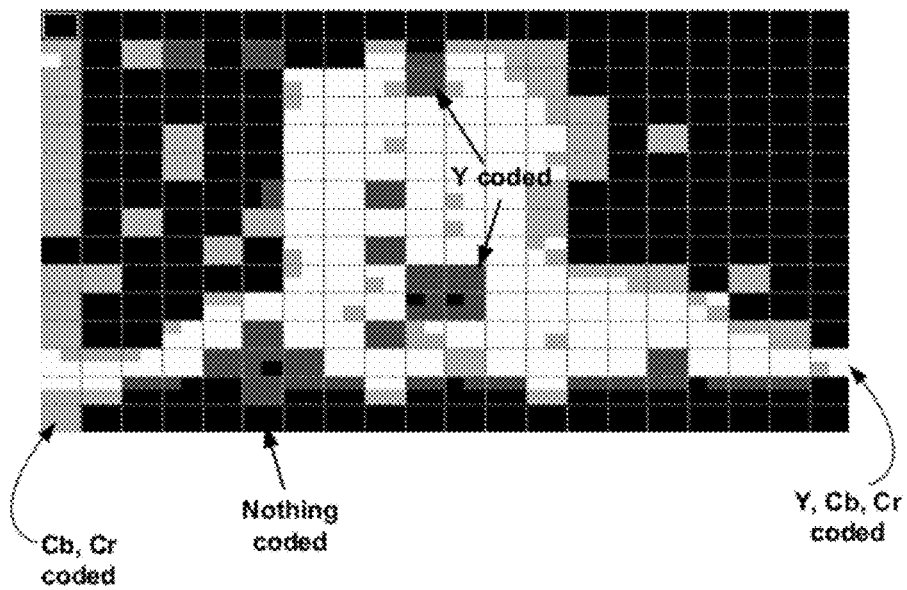
Figure 13A:
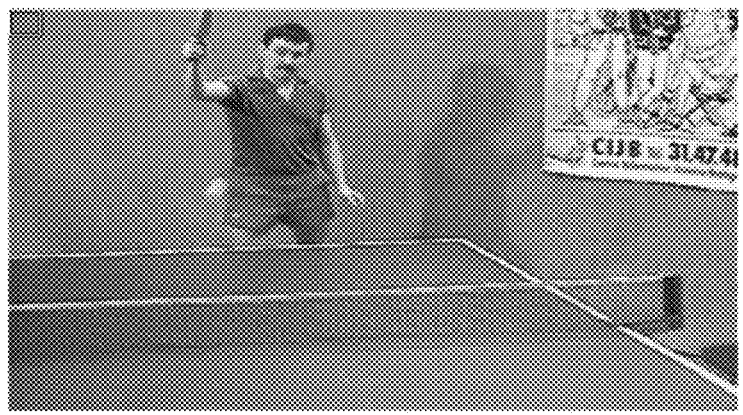
FIGS. 13A and 13B are diagrams illustrating a third video scene and correlation of CBP values to an approximate ROI in the third video scene.
Figure 13B:
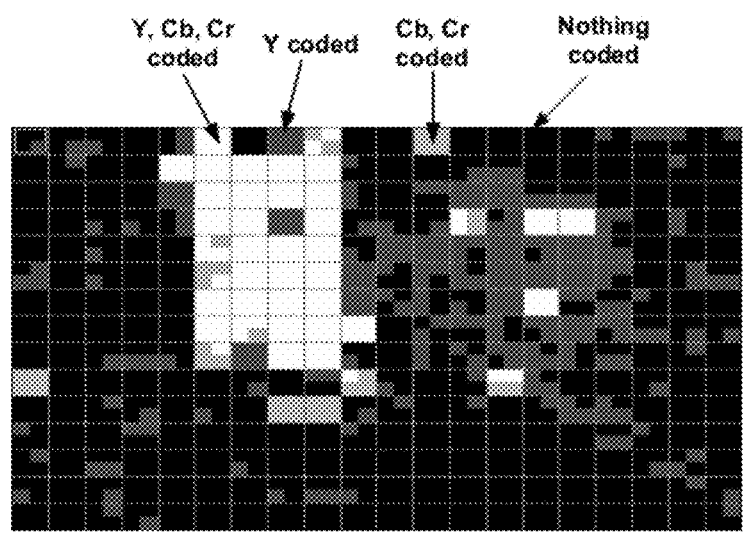

FIGS. 11A and 11B are diagrams illustrating a first video scene and correlation of CBP to an approximate ROI in the video scene. The first video scene is a frame from the mother-daughter video test sequence. FIGS. 12A and 12B are diagrams illustrating a second video scene and correlation of CBP to an approximate ROI in the second video scene. The second video scene is a movie clip. FIGS. 13A and 13B are diagrams illustrating a third video scene and correlation of CBP to an approximate ROI in the third video scene. The third video scene is a frame from the table tennis video test sequence. FIGS. 11B, 12B and 13B depict CBP maps for the video frames in FIGS. 11A, 12A, and 13A, respectively.

In FIG. 11A, the frame from the mother-daughter video test sequence includes two face regions for possible ROI detection. Applying a CBP-based ROI detection, as described with respect to CBP-based ROI mask generator of FIG. 4, the encoded video for the frame of FIG. 11A produces a CBP map as shown in FIG. 11B. In the CBP map, different shaded blocks correspond to different CBP's, which can be compared to the CBP's in Table 1 for ranking and inclusion in an ROI map. For example, FIG. 11B shows various clusters having a first shade that corresponds to the coding of Y (having rank 3), a second shade corresponding to the coding of Y, Cb, and Cr (having rank 1), a third shade corresponding to the coding of Cb and Cr, and another shade indicating no motion and hence nothing coded (having other lower ranks). Per Table 1, MBs with a CBP that qualifies as one of the two highest ranks, i.e., Rank 1 or Rank 3, are marked as ROI MBs.

FIGS. 11A, 11B, 12A, 12B, 13A, and 13B demonstrate validity of assumptions made in the design of the techniques described in this disclosure, which were empirically verified using a bitstream analyzer. The use of DC chroma values for I frames is similar to the extraction of ROI from the pixel domain using a sub-sampled version of the frame, where each MB has been replaced by its DC value. For the P-frame, the correlation of the CBP to an approximate ROI is evident from FIGS. 11A, 11B, 12A, 12B, 13A and 13B. In FIG. 11B, the predominant cluster is formed by MBs having rank 3 from Table 1, as only Y has been coded. This cluster shows a strong correspondence to the face regions of the mother and the daughter in the frame. Similarly, in FIG. 12B, the predominant cluster is formed of Rank 1 MBs, in which Y, Cb, and Cr are coded. In FIG. 13B, the predominant cluster is the entire body of the athlete, illustrating that the techniques described in this disclosure can effectively detect an ROI other than a face region. For such cases, the shape based refinement stage provided by ROI mask refiner 60 can be changed to refine non-face ROI. In other words, ROI mask refiner 60 may use edge and non-smooth interior criteria adapted to desired objects, such as a body in the example of FIG. 13B.

Figure 14A:
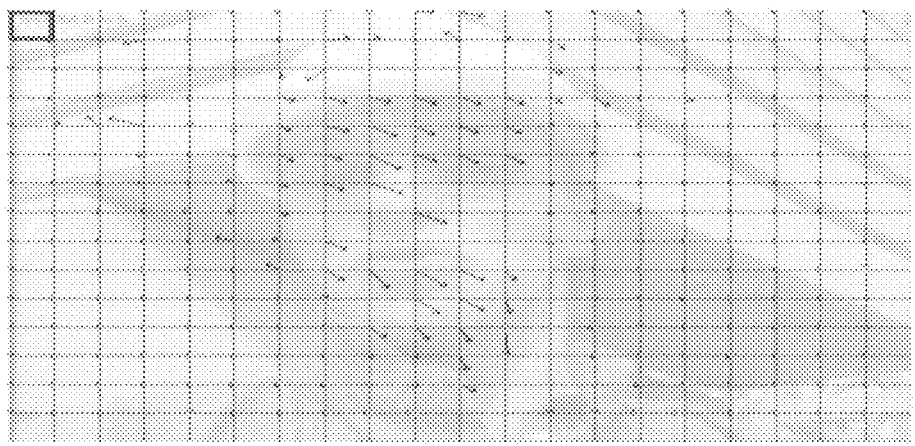
FIGS. 14A, 14B and 14C are diagrams illustrating motion vector (MV) consistency in terms of uniformity of motion vectors over MBs in an ROI of a video frame.
Figure 14B:
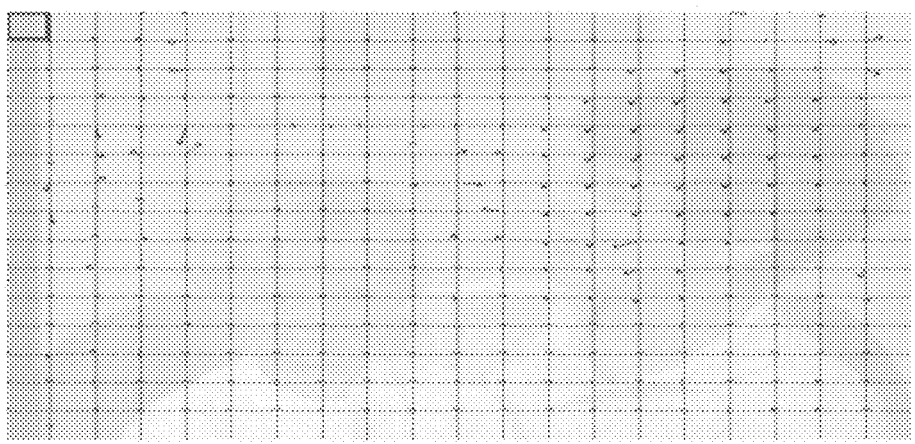
Figure 14C:

FIGS. 14A, 14B and 14C are diagrams illustrating motion vector (MV) consistency in terms of uniformity of motion vectors over MBs in an ROI of a video frame. Each diagram depicts a video frame having a grid of MBs with arrows indicating the direction and magnitude of MVs associated with MBs in the pertinent ROI. FIG. 14A shows the uniformity of motion vectors for a majority of MBs in the face region of a frame from the Foreman video test sequence. FIG. 14B shows the uniformity of motion vectors for a majority of MBs in the face regions of a frame from the mother-daughter video test sequence. In FIGS. 14A and 14B, in the ROI, most of the MBs have very similar MV direction and/or magnitude. FIG. 14C shows MV consistency in a frame from a movie clip. In the example of FIG. 14C, the motion vector magnitudes and angles in the ROI, i.e., the face, do not vary significantly. Accordingly, using a combination of the CBP and motion vector consistency in a two stage scheme can effectively identify the ROI in a given frame. In the case of a frame having high QP, most MBs could be "not coded." In this case, the CBP and MV information are unreliable, and the proposed 2-stage scheme could fail. Hence, these cases are detected in the ROI-reliability analyzer so that the entire bitstream domain ROI extraction process is bypassed in favor of a pixel domain ROI extraction.

Figure 15:
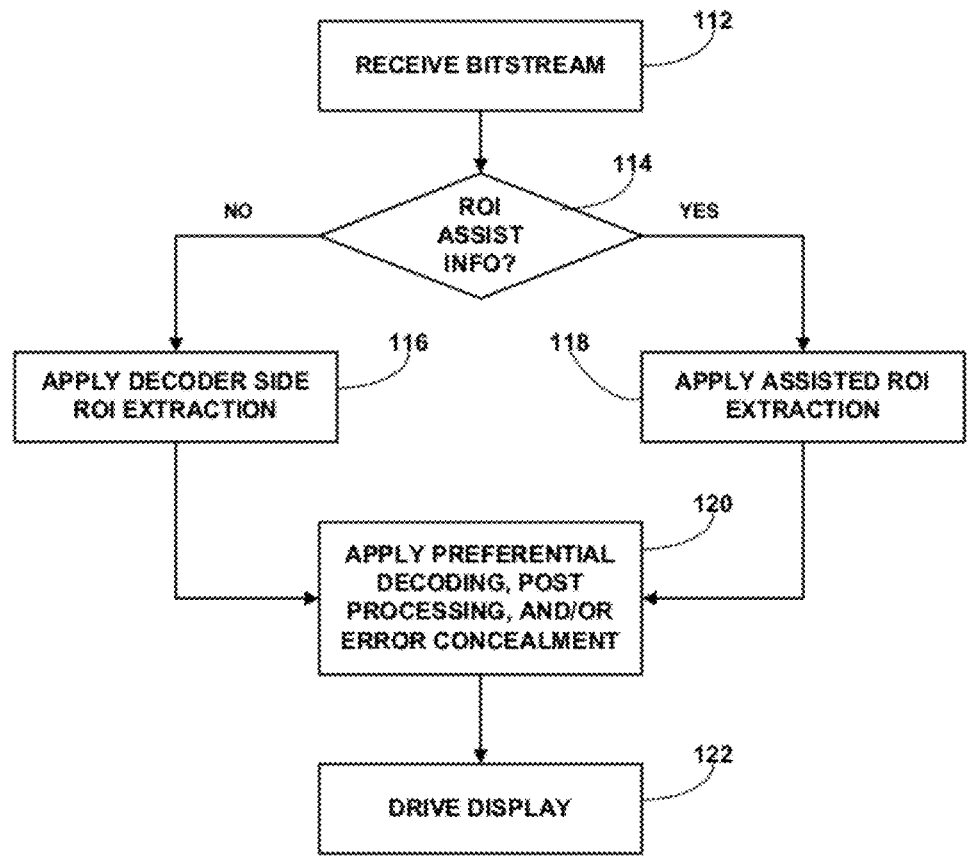
FIG. 15 is a flow diagram illustrating selective activation of assisted ROI extraction or decoder side ROI extraction in the video decoder of FIG. 1.

FIG. 15 is a flow diagram illustrating selective activation of encoder-assisted ROI extraction or decoder only ROI extraction in the video decoder 24 of FIG. 1. As shown in FIG. 15, video decoder 24 receives the encoded video bitstream (112), and determines whether the bitstream includes an ROI assist signal, code or pattern (114), e.g., via ROI signal detector module 40 (FIG. 3). Alternatively, as mentioned previously, the ROI assist signal, code or pattern may be provided in out-of-band side information. If the ROI assist signal is present (114), decoder 24 applies assisted ROI extraction (118). For example, decoder 24 may make use of an ROI MB map or other information provided by encoder 18 or an intermediate device. Alternatively, if the ROI assist signal or information is not present, decoder 24 applies decoder-side ROI extraction (116), e.g., according to the techniques described with reference to FIGS. 4-10. In either case, decoder 24 uses the resulting ROI to apply preferential decoding, post processing and/or error concealment to the ROI (120), or to the non-ROI areas of the video frame. Upon decoding, post processing, and/or error concealment, destination device 12 drives display 38 (122) to provide a visible representation of the decoded video.

Figure 16:
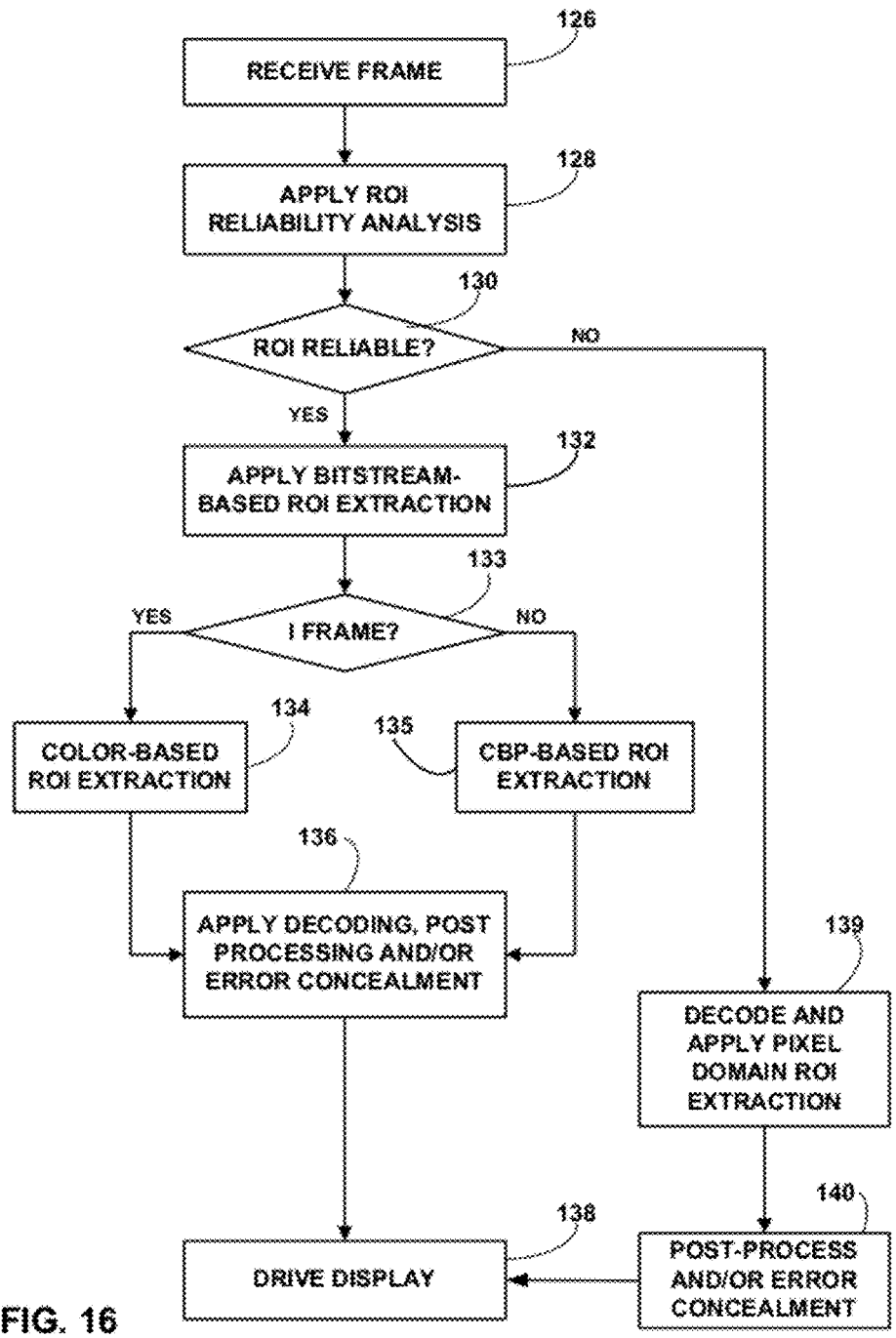
FIG. 16 is a flow diagram illustrating application of an ROI reliability analysis and selective application of bitstream-based and pixel domain ROI extraction.

FIG. 16 is a flow diagram illustrating application of an ROI reliability analysis and selective application of bitstream-based and pixel domain ROI extraction. The operations shown in FIG. 16 may be implemented, for example, via the components shown in FIG. 4. Upon receiving an encoded video frame (126), and determining that no encoder ROI assistance is available, decoder 24 applies an ROI reliability analysis (128) to determine whether bitstream domain ROI extraction would be reliable (130). If not, decoder 24 applies decodes the encoded video and applies pixel domain ROI extraction to the pixels resulting from the decoding operation (139). Using the pixel domain ROI extraction (139), decoder 24 applies preferential post processing and/or error concealment to the ROI (140), and drives display (138) to present the resulting video.

If bitstream domain ROI extraction is deemed reliable (128, 130), decoder 24 applies bitstream-based ROI extraction (132). In particular, decoder 24 determines whether a current frame is an I frame (133). If so, decoder 24 applies color-based ROI extraction (134), e.g., via color-based ROI mask generator 62. If not, the frame is a P (or B) frame, and decoder 24 applies CBP-based ROI extraction (135), e.g., via CBP-based ROI mask generator 58. As mentioned previously, however, intra-coded MBs in a P frame may be subjected to color-based ROI extraction (134) in some cases, if the P frame includes numerous I MBs. Decoder 24 may apply second stages of ROI extraction to refine the ROIs produced according to operations 134 and 135. For example, shape-based, motion-based, and/or color-based refinement techniques may be applied to the ROI, as described in this disclosure. In each case, decoder 24 applies preferential decoding, post processing and/or error concealment to the ROI (136), or to the non-ROI areas of the video frame, and drives display 138 to present the decoded video (138).

Figure 17:
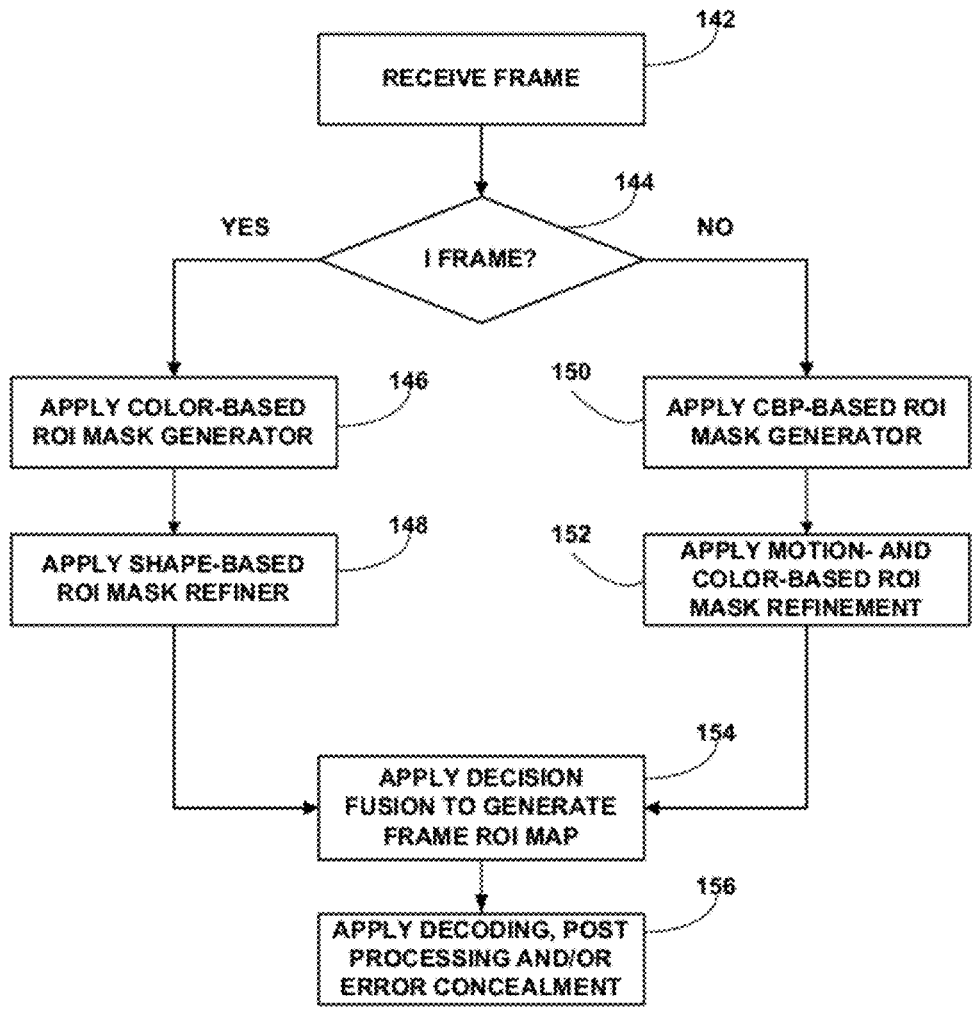
FIG. 17 is a flow diagram illustrating application of staged ROI extraction techniques for I data and P (or B) data.

FIG. 17 is a flow diagram illustrating application of staged ROI extraction techniques for I frames and P frames. As shown in FIG. 17, upon receipt of a video frame (142), for decoder-side ROI extraction, decoder 24 determines whether the frame is an I frame or a P (or B) frame (144). For I frames, decoder 24 applies color-based ROI mask generator 62 in a first stage to produce a coarse ROI (146), and then applies a shape-based ROI mask refiner 64 to refine the coarse ROI. For P (or B) frames, decoder 24 applies a CBP-based ROI mask generator 58 to produce a coarse ROI (150), and then applies a motion- and color-based ROI mask refiner 60 (152) to refine the coarse ROI. Decoder 24 applies decision fusion to select an ROI from the I frame path or the P frame path, or combine ROI information from both paths, to generate an ROI map for the frame (154).

Additionally, or alternatively, decision fusion may be applied for the case when a P frame has a significant number of intra-coded MBs. In this case, Frame type detector 52 may be configured to determine whether a P frame has more than a threshold level of intra-coded MBs. If so, intra-coded MBs for a given frame can be passed through I data ROI processor 56 and inter-coded MBs for the same frame can be passed through P data ROI processor 54. Decision fusion-based ROI map generator 66 then may compose an ROI map using ROI markings applied to intra-coded MBs by I data ROI processor 56 and ROI markings applied to inter-coded MBs by P data ROI processor 54 for a given frame. In addition, in some implementations, decision fusion-based ROI map generator 66 may include intelligence to further validate the designated ROI, e.g., using past ROI information from previous frames. Once the ROI MAP is available (154), decoder applies preferential decoding, post processing and/or error concealment to the ROI (156) to enhance visual quality of the ROI.

This disclosure describes various techniques for ROI detection, including techniques for determining whether encoder assistance is available and decoder-side ROI detection techniques. Decoder-side ROI detection techniques may include bitstream domain ROI detection, pixel domain detection and techniques for reliability analysis to determine whether to use bitstream domain ROI detection or pixel domain detection. Bitstream domain ROI detection may include different techniques for inter-coded information and intra-coded information, and may include two- or multi-stage ROI refinement processes including the use of CBP-based, color-based, motion-based and shape-based ROI detection and refinement.

Preferential decoding, post-processing and/or error concealment may be applied to the ROI to enhance the visual quality of the ROI. Preferential decoding for the ROI region can be useful in complexity scalable decoders where high-complexity decoding can be employed for ROI regions and low complexity decoding can be used for non-ROI regions. For instance, in non-ROI regions, the DCT coefficients can be pruned before computing the IDCT, e.g., as described in S. Peng, "Complexity scalable video decoding via IDCT data pruning," International Consumer Electronics, 2001. Complexity scalability of video decoding can save computational expense involved in decoding non-ROI areas of the video frame, and reapportion that computational expense to the decoding of the ROI area.

If it is known or likely that encoder 18 has already applied preferential encoding to the ROI, decoder 24 alternatively may apply preferential decoding to the non-ROI areas of the video frame. Preferential processing of non-ROI areas may compensate for poor encoding, e.g., with less encoding bits, at the transmitter side. In other words, if the ROI has already benefited from preferential processing at the encoder side, additional processing may be devoted to the non-ROI areas instead of the ROI area. As another example, different levels of processing may be applied to the ROI and non-ROI areas at the decoder side based on a determination or assumption of whether preferential ROI processing was applied at the encoder side. To determine whether to apply preferential encoding to the ROI or non-ROI, decoder 24 may include a module that analyzes the quantization parameter (QP) values of the ROI and non-ROI areas. For example, if average QP of the non-ROI MBs is less than the average QP of the ROI MBs by a predetermined threshold value, indicating poor quantization of the non-ROI, then decoder 24 may reasonably conclude that preferential processing has already been applied to the ROI at the encoder or an intermediate device in the network. In this case, decoder 24 may apply preferential processing, such as preferential decoding, post-processing or error concealment, to the non-ROI areas of the video frame. Hence, application of preferential processing, e.g., per box 120, 136, or 156 of FIGS. 15, 16 and 17, respectively, may further include determining whether to apply the preferential processing to the ROI or non-ROI based on some criteria such as the relative average QP values in the ROI and non-ROI, as discussed above. In one example, decoder 24 may compare quantization of the identified ROI with quantization of non-ROI areas of the video data, preferentially process the non-ROI if the comparison indicates poor quantization of the non-ROI relative to the ROI, and otherwise preferentially process the ROI. This function may be performed, for example, within a post-processor module 48 of decoder 24, or elsewhere within decoder 24.

Preferential post-processing may include selective application of advanced post-processing schemes such as de-ringing and color bleeding reduction to the ROI, or alternatively to non-ROI areas. For example, such post-processing schemes may be applied selectively to the ROI, but not to the non-ROI areas, or vice versa, thereby devoting more processing resources to the area that would benefit more from such processing. Hence, in situations where the decoder side resources are limited and post-processing is costly, the post-processing operations can be applied selectively to the ROI. This ensures that artifacts are reduced in the most important region of the image. For instance, color bleeding reduction can be computationally expensive. By applying color bleeding reduction around the face region (i.e. the ROI), color artifacts that otherwise would be dominantly visible can be reduced. Other post-processing techniques such as sharpening or de-ringing also may be selectively applied to the ROI and/or non-ROI areas.

Error concealment also may be preferentially applied to eliminate errors in the area most important to the viewer, i.e., the ROI, or to the non-ROI areas if the ROI has already benefited from preferential encoder-side processing. Knowledge of the ROI map of a given frame and also the preceding frame can help in performing advanced error concealment. Depending on the extent of packet loss in the given frame, error concealment techniques may range from subtle operations to aggressive operations. For example, if errors are severe, e.g., a major portion of the ROI has been lost, the previous frame may be repeated. Alternatively, is some portion of the ROI in the current frame is lost, the ROI can be replaced with the ROI from the previous frame. As a further alternative, if the ROI region is not significantly impacted by packet loss, then the error concealment operation may involve performing conventional spatial/temporal error concealment.

In each case, decoder-side ROI detection permits decoder 24 to devote additional processing cost to the most visually important area of the video frame, i.e., the ROI. In this manner, decoder 24 can apply one or more operations designed to visually enhance the ROI and improve the overall viewing experience of the user. When bitstream domain ROI extraction is deemed reliable, decoder 24 can achieve visual enhancement of the ROI with much less complexity than pixel domain ROI extraction. Decoder 24 can be configured to selectively apply bitstream domain or pixel domain ROI extraction based on reliability to intelligently balance processing overhead and power consumption versus visual quality.

The techniques described herein may be implemented in hardware, software, firmware, or any combination thereof. If implemented in software, the techniques may be realized at least in part by one or more stored or transmitted instructions or code on a computer-readable medium. Computer-readable media may include computer storage media, communication media, or both, and may include any medium that facilitates transfer of a computer program from one place to another. A storage media may be any available media that can be accessed by a computer.

By way of example, and not limitation, such computer-readable media can comprise a data storage medium such as RAM, such as synchronous dynamic random access memory (SDRAM), read-only memory (ROM), non-volatile random access memory (NVRAM), ROM, electrically erasable programmable read-only memory (EEPROM), EEPROM, FLASH memory, CD-ROM or other optical disk storage, magnetic disk storage or other magnetic storage devices, or any other medium that can be used to carry or store desired program code in the form of instructions or data structures and that can be accessed by a computer.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically, e.g., with lasers. Combinations of the above should also be included within the scope of computer-readable media.

The code associated with a computer-readable medium of a computer program product may be executed by a computer, e.g., by one or more processors, such as one or more digital signal processors (DSPs), general purpose microprocessors, application specific integrated circuits (ASICs), field programmable logic arrays (FPGAs), or other equivalent integrated or discrete logic circuitry. In some aspects, the functionality described herein may be provided within dedicated software modules or hardware modules configured for encoding and decoding, or incorporated in a combined video encoder-decoder (CODEC).

Various embodiments have been described. These and other embodiments are within the scope of the following claims.

The invention claimed is:

1. A method comprising:
   identifying a region of interest (ROI) in encoded video data based on color characteristics of the encoded video data for intra-coded data;
   identifying the ROI based on coded block pattern (CBP) characteristics of the encoded video data for inter-coded data;
   processing a portion of the encoded video data based on the identified ROI to produce higher visual quality relative to other portions of the encoded video data; and
   comparing quantization of the identified ROI with quantization of non-ROI areas of video data, wherein processing includes processing the non-ROI areas if the comparing indicates poor quantization of the non-ROI areas relative to the ROI.

2. The method of claim 1, further comprising refining the ROI based on shape characteristics of the encoded video data for intra-coded data.

3. The method of claim 1, further comprising refining the identified ROI based on motion and color characteristics of the encoded video data for inter-coded data.

4. The method of claim 1, wherein processing the portion of the encoded video data comprises using at least one of enhanced post-processing and enhanced error concealment to the identified ROI.

5. The method of claim 1, wherein comparing quantization includes analyzing quantization parameter values for luma and chroma components of the encoded video data, and wherein the comparing indicates poor quantization of the non-ROI areas relative to the ROI when average quantization parameter values for luma and chroma components exceed a predetermined threshold value.

6. A device comprising:
   a video decoder;
   a first module of the video decoder that identifies a region of interest (ROI) in encoded video data based on color characteristics of the encoded video data for intra-coded data;
   a second module of the video decoder that identifies the ROI based on coded block pattern (CBP) characteristics of the encoded video data for inter-coded data;
   a processing module of the video decoder that processes a portion of the encoded video data based on the identified ROI to produce higher visual quality relative to other portions of the encoded video data, and that compares quantization of the identified ROI with quantization of non-ROI areas of video data, and processes the non-ROI areas if the comparison indicates poor quantization of the non-ROI areas relative to the ROI.

7. The device of claim 6, wherein the first module refines the ROI based on shape characteristics of the encoded video data for intra-coded data.

8. The device of claim 6, wherein the second module refines the identified ROI based on motion and color characteristics of the encoded video data for inter-coded data.

9. The device of claim 6, wherein the processing module processes the portion of the encoded video data using at least one of enhanced post-processing and enhanced error concealment.

10. The device of claim 6, wherein the processing module compares quantization by analyzing quantization parameter values for luma and chroma components of the encoded video data, and wherein the comparison indicated poor quantization of the non-ROI areas relative to the ROI when average quantization parameter values for luma and chroma components exceed a predetermined threshold value.

11. A device comprising:
   means for identifying a region of interest (ROI) in encoded video data based on color characteristics of the encoded video data for intra-coded data;
   means for identifying the ROI based on coded block pattern (CBP) characteristics of the encoded video data for inter-coded data;

means for processing a portion of the encoded video data based on the identified ROI to produce higher visual quality relative to other portions of the encoded video data; and means for comparing quantization of the identified ROI with quantization of non-ROI areas of video data, wherein processing includes processing the non-ROI areas if the comparing indicates poor quantization of the non-ROI areas relative to the ROI.

12. The device of claim 11, further comprising means for refining the ROI based on shape characteristics of the encoded video data for intra-coded data.

13. The device of claim 11, further comprising means for refining the identified ROI based on motion and color characteristics of the encoded video data for inter-coded data.

14. The device of claim 11, wherein processing the portion of the encoded video data comprises using at least one of enhanced post-processing and enhanced error concealment to the identified ROI.

15. The device of claim 11, wherein comparing quantization includes analyzing quantization parameter values for luma and chroma components of the encoded video data, and wherein the comparing indicates poor quantization of the non-RIO areas relative to the ROI when average quantization parameter values for luma and chroma components exceed a predetermined threshold value.

16. A non-transitory computer-readable medium comprising instructions to cause a processor to:
identify a region of interest (ROI) in encoded video data based on color characteristics of the encoded video data for intra-coded data;
identify the ROI based on coded block pattern (CBP) characteristics of the encoded video data for inter-coded data;
process a portion of the encoded video data based on the identified ROI to produce higher visual quality relative to other portions of the encoded video data; and
compare quantization of the identified ROI with quantization of non-ROI areas of video data, wherein processing includes processing the non-ROI areas if the comparing indicates poor quantization of the non-ROI areas relative to the ROI.

17. The computer-readable medium of claim 16, further comprising instructions to cause the processor to refine the ROI based on shape characteristics of the encoded video data for intra-coded data.

18. The computer-readable medium of claim 16, further comprising instructions to cause the processor to refine the identified ROI based on motion and color characteristics of the encoded video data for inter-coded data.

19. The computer-readable medium of claim 16, wherein processing the portion of the encoded video data comprises using at least one of enhanced post-processing and enhanced error concealment to the identified ROI.

20. The computer-readable medium of claim 16, wherein comparing quantization includes analyzing quantization parameter values for luma and chroma components of the encoded video data, and wherein the comparing indicates poor quantization of the non-RIO areas relative to the ROI when average quantization parameter values for luma and chroma components exceed a predetermined threshold value.

* * * * *